(12) United States Patent
Makino et al.

(10) Patent No.: US 11,200,880 B2
(45) Date of Patent: Dec. 14, 2021

(54) INFORMATION PROCESSOR, INFORMATION PROCESSING SYSTEM, AND INFORMATION PROCESSING METHOD

(71) Applicant: SONY CORPORATION, Tokyo (JP)

(72) Inventors: Kenichi Makino, Kanagawa (JP); Kohei Asada, Kanagawa (JP); Tetsunori Itabashi, Kanagawa (JP); Shigetoshi Hayashi, Tokyo (JP); Go Igarashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/621,072

(22) PCT Filed: Mar. 26, 2018

(86) PCT No.: PCT/JP2018/012078
§ 371 (c)(1),
(2) Date: Dec. 10, 2019

(87) PCT Pub. No.: WO2019/003525
PCT Pub. Date: Jan. 3, 2019

(65) Prior Publication Data
US 2020/0202837 A1   Jun. 25, 2020

(30) Foreign Application Priority Data

Jun. 28, 2017   (JP) .............................. JP2017-125857

(51) Int. Cl.
*G10K 11/178* (2006.01)

(52) U.S. Cl.
CPC .. *G10K 11/17873* (2018.01); *G10K 11/17854* (2018.01); *G10K 2210/1081* (2013.01);
(Continued)

(58) Field of Classification Search
CPC ....... G10K 11/17873; G10K 11/17854; G10K 2210/1081; G10K 2210/1282;
(Continued)

(56) References Cited

U.S. PATENT DOCUMENTS 9,773,494 B2* 9/2017 Kwan ............... G10K 11/17855
9,978,357 B2* 5/2018 Benway ........... G10K 11/17873
(Continued)

FOREIGN PATENT DOCUMENTS

JP   04-008098 A   1/1992
JP   06-067679 A   3/1994
(Continued)

OTHER PUBLICATIONS

International Search Report and Written Opinion of PCT Application No. PCT/JP2018/012078, dated May 22, 2015, 10 pages of ISRWO.

*Primary Examiner* — Disler Paul
(74) *Attorney, Agent, or Firm* — Chip Law Group

(57) ABSTRACT

Provided is an information processor including a signal processing section that acquires a first signal to be detected by an acoustic input section of a first unit including the acoustic input section disposed within a predetermined distance from one ear hole of a user in a state of being worn by the user, acquires a second signal, which indicates a noise generated from a noise source, to be acquired by a second unit, and generates a noise cancellation signal directed to the noise on the basis of the first signal and the second signal.

18 Claims, 14 Drawing Sheets

(52) U.S. Cl.
CPC .............. *G10K 2210/1282* (2013.01); *G10K 2210/3028* (2013.01); *G10K 2210/3036* (2013.01)

(58) Field of Classification Search
CPC ... G10K 2210/3028; G10K 2210/3026; G10K 11/17883
USPC ...................................... 381/71.1, 71.6, 71.4
See application file for complete search history.

(56) References Cited

U.S. PATENT DOCUMENTS

| | | | |
|---|---|---|---|
| 10,170,095 B2* | 1/2019 | Yamkovoy | G10K 11/17881 |
| 10,614,790 B2* | 4/2020 | Cattell | G10K 11/17885 |
| 2011/0116675 A1* | 5/2011 | Terlizzi | H04R 1/1083 |
| | | | 381/384 |
| 2013/0156213 A1* | 6/2013 | Pan | H04R 29/00 |
| | | | 381/71.4 |
| 2016/0027428 A1* | 1/2016 | Gul | B60N 2/879 |
| | | | 381/71.4 |
| 2017/0200442 A1* | 7/2017 | Yamabe | G10K 11/17827 |
| 2017/0301338 A1* | 10/2017 | Butts | H04R 1/406 |
| 2018/0025718 A1* | 1/2018 | Zukowski | G10K 11/17881 |
| | | | 381/71.6 |
| 2018/0160211 A1* | 6/2018 | Kirsch | H04R 1/1041 |
| 2018/0270571 A1* | 9/2018 | Di Censo | H04R 3/005 |
| 2018/0308467 A1* | 10/2018 | Yamkovoy | H04R 1/1083 |

FOREIGN PATENT DOCUMENTS

| | | |
|---|---|---|
| JP | 2007-003994 A | 1/2007 |
| JP | 2016-061868 A | 4/2016 |
| JP | 2017-097186 A | 6/2017 |
| WO | 2016/067700 A1 | 5/2016 |

* cited by examiner

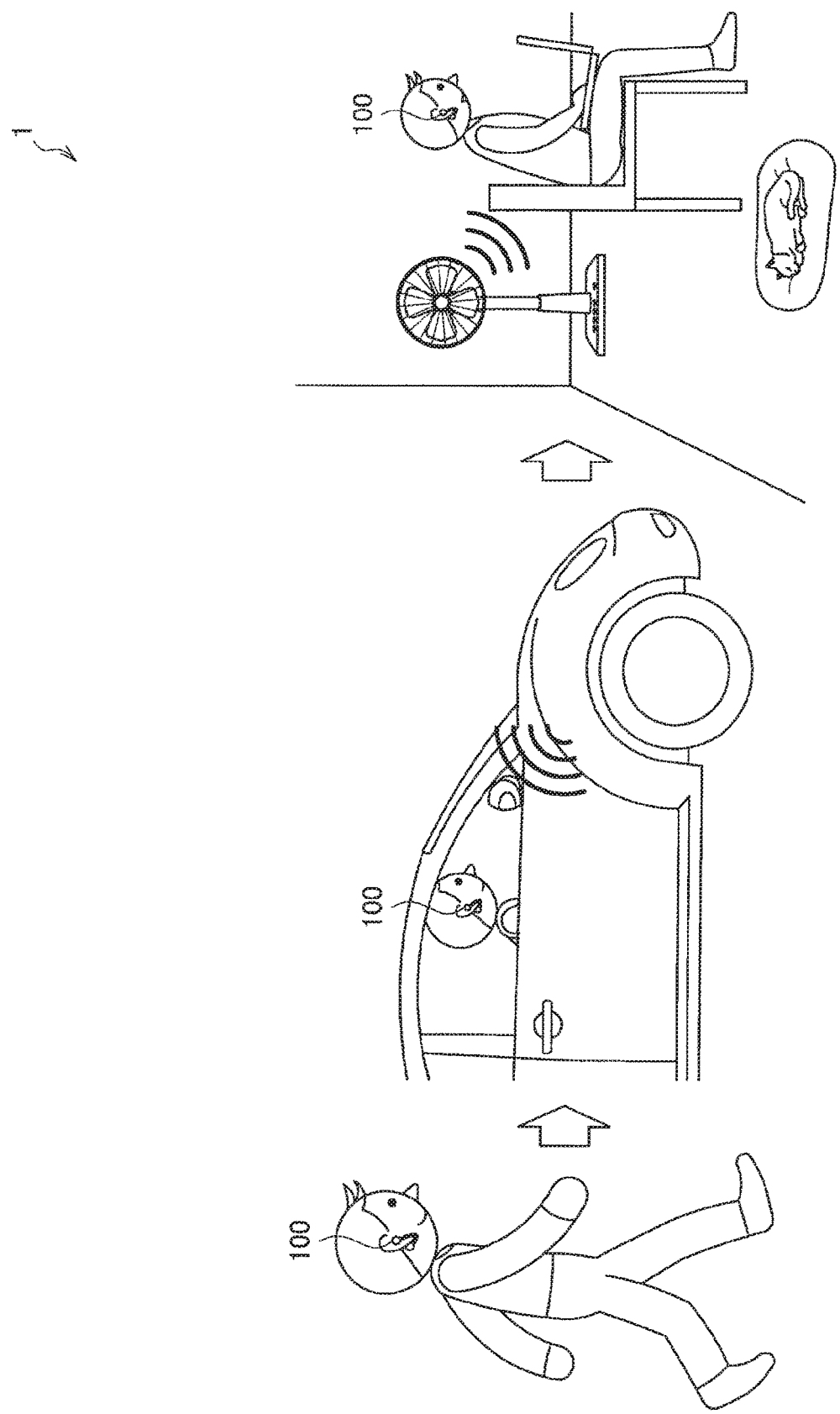
[FIG. 1]

[FIG. 2]
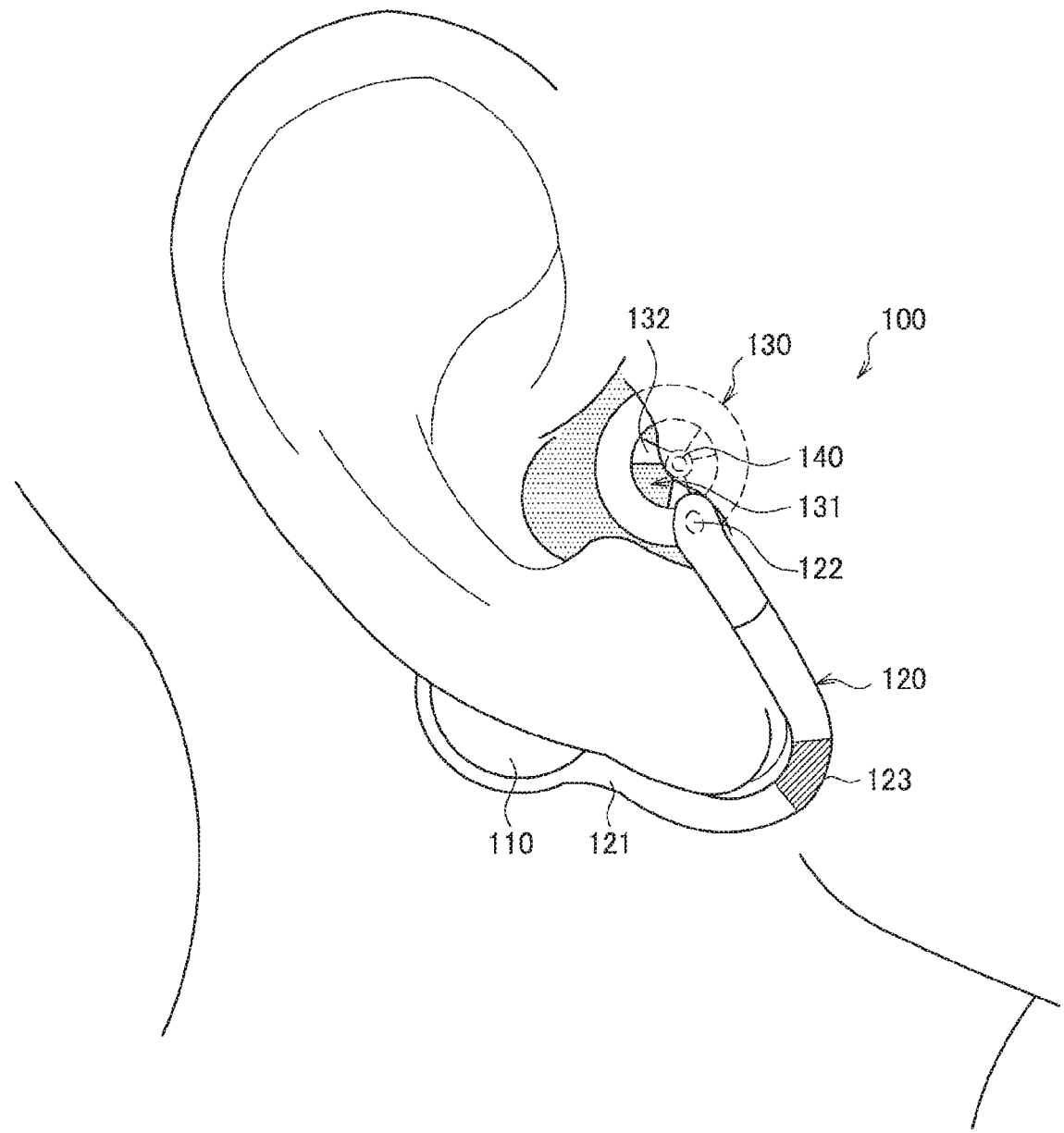

[FIG. 3]
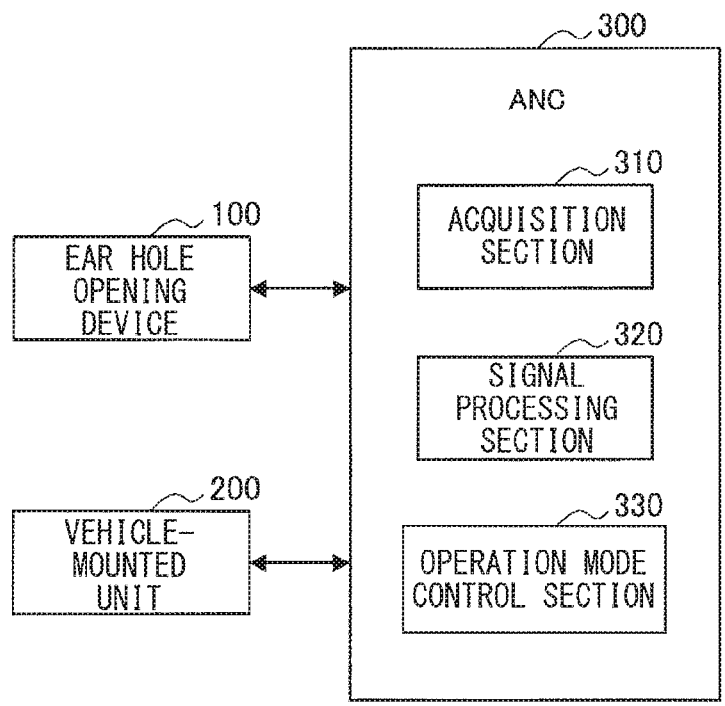

[FIG. 4]
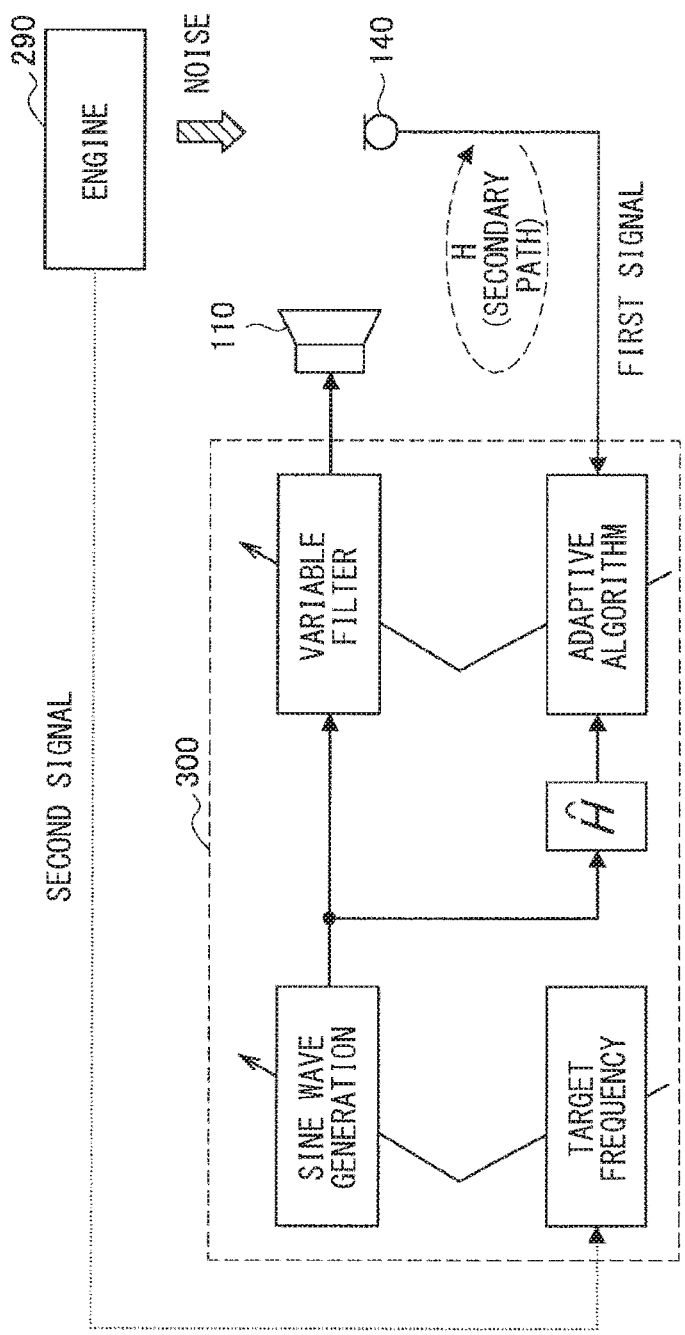

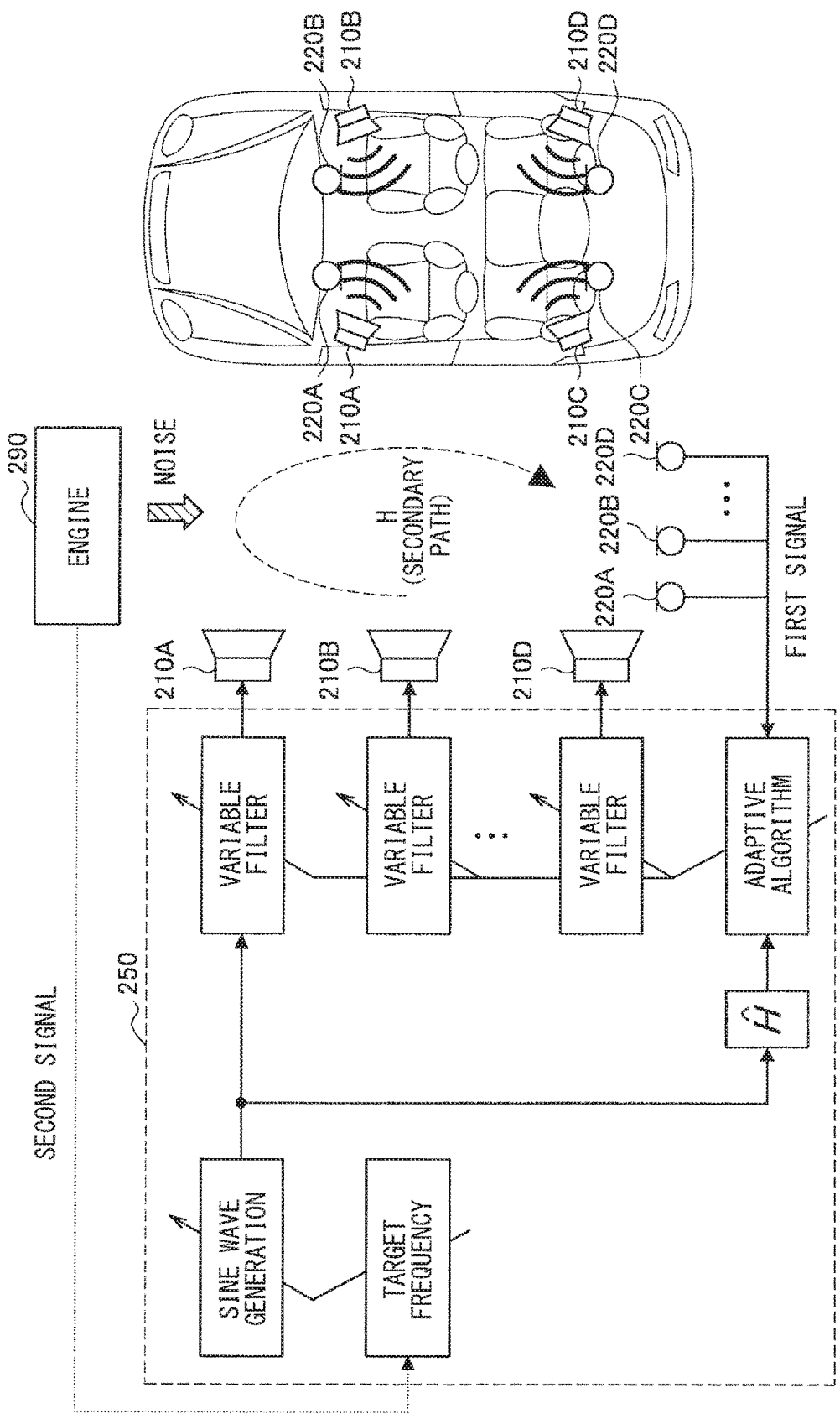
[FIG. 5]

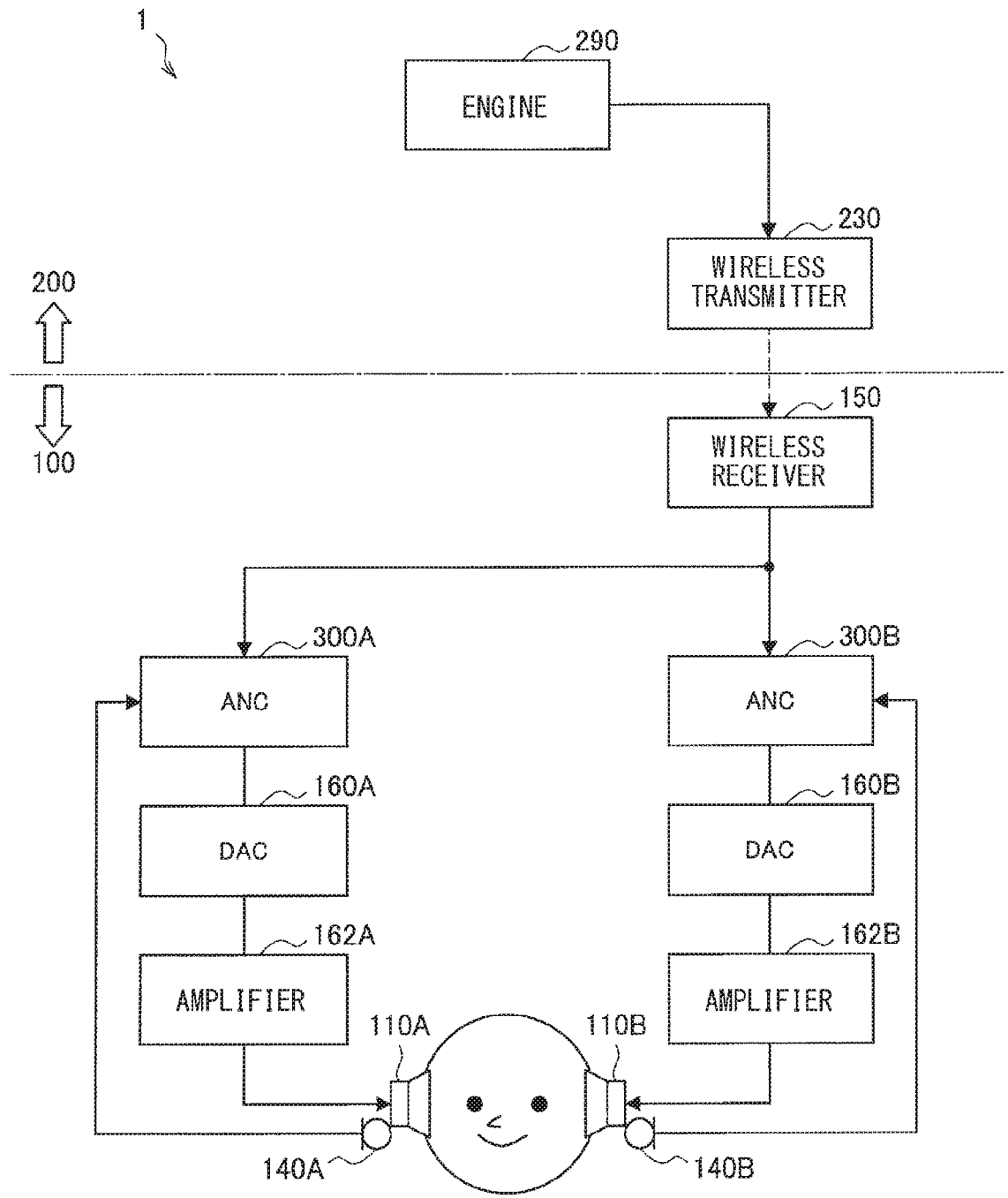
[FIG. 6]

[FIG. 7]
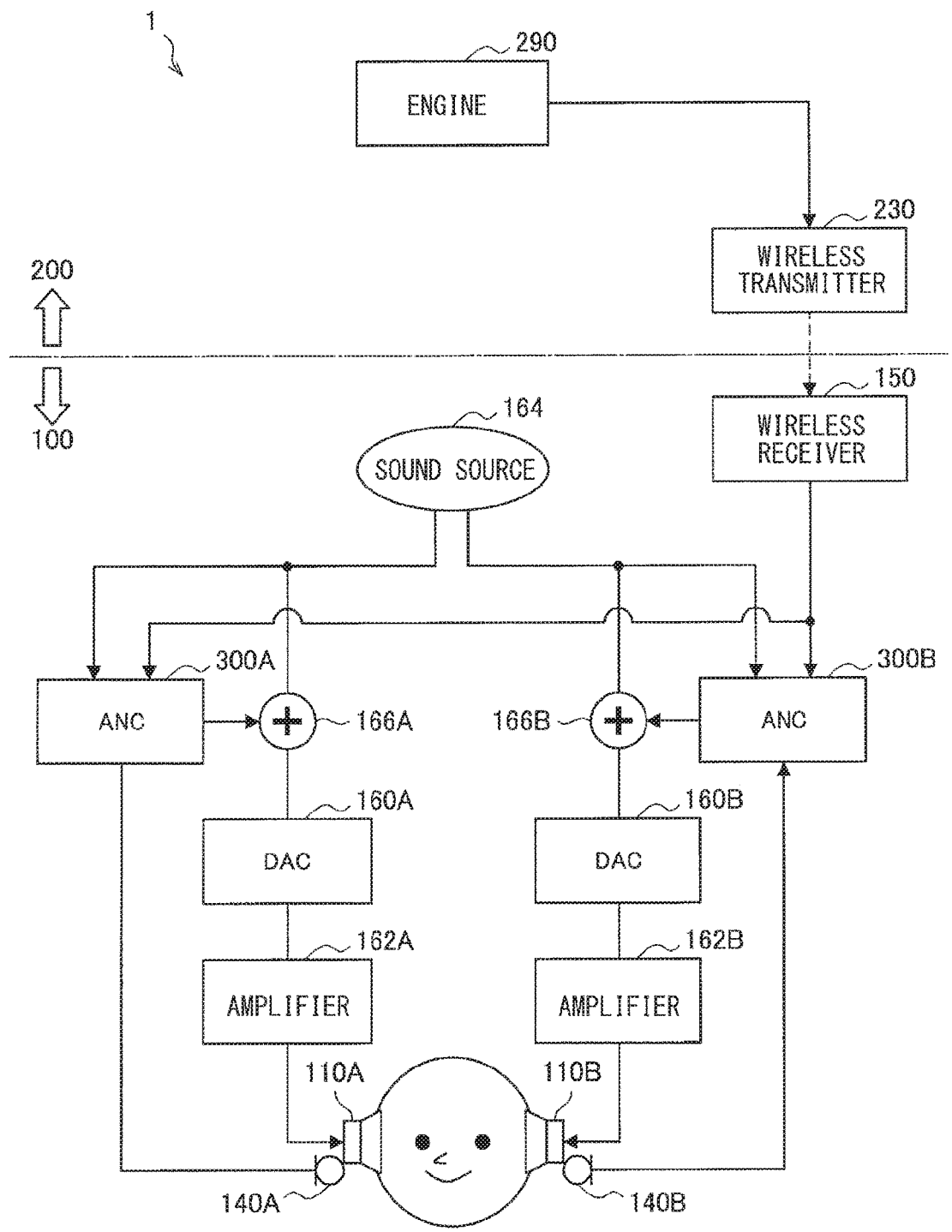

[FIG. 8]
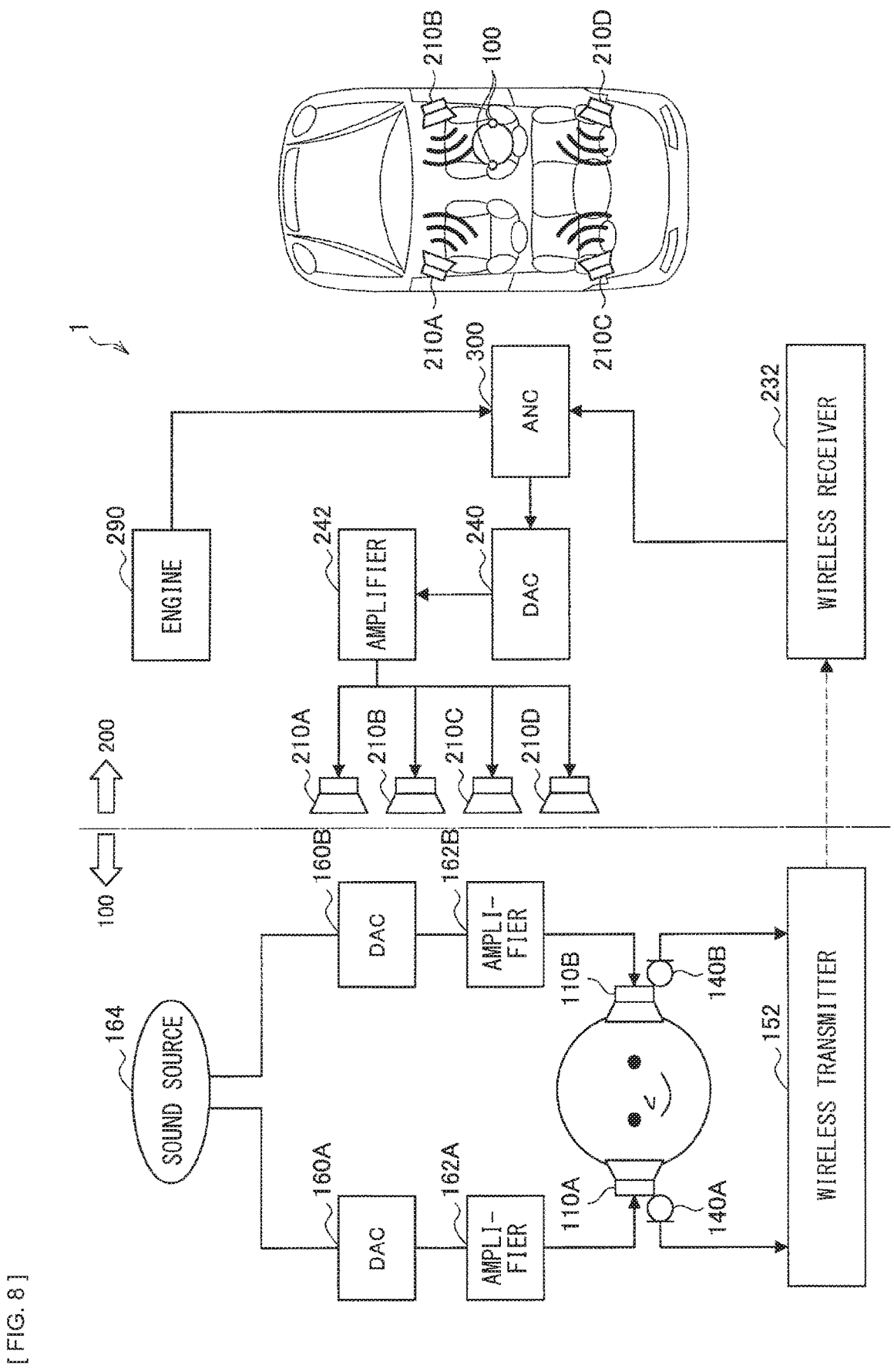

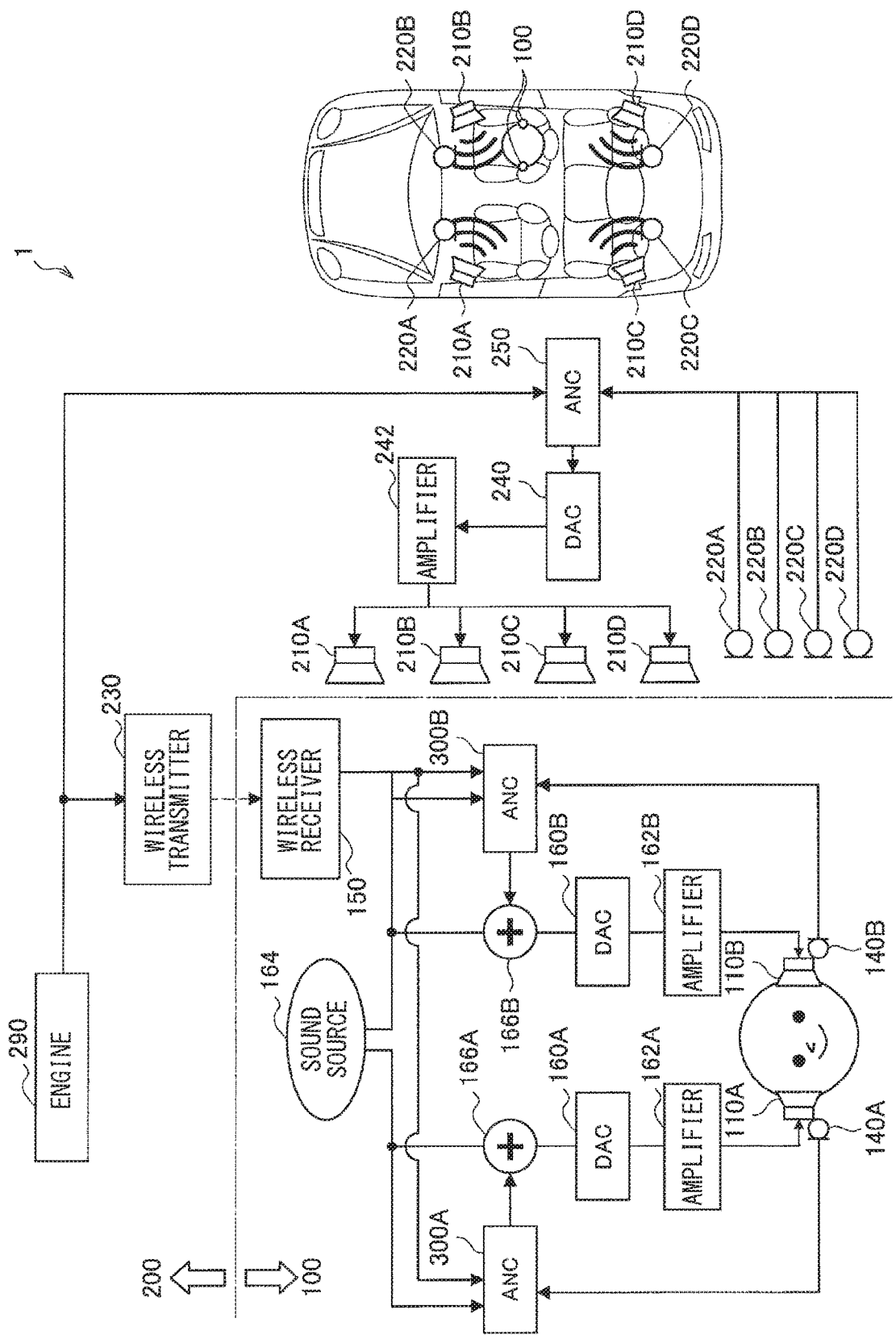
[FIG. 9]

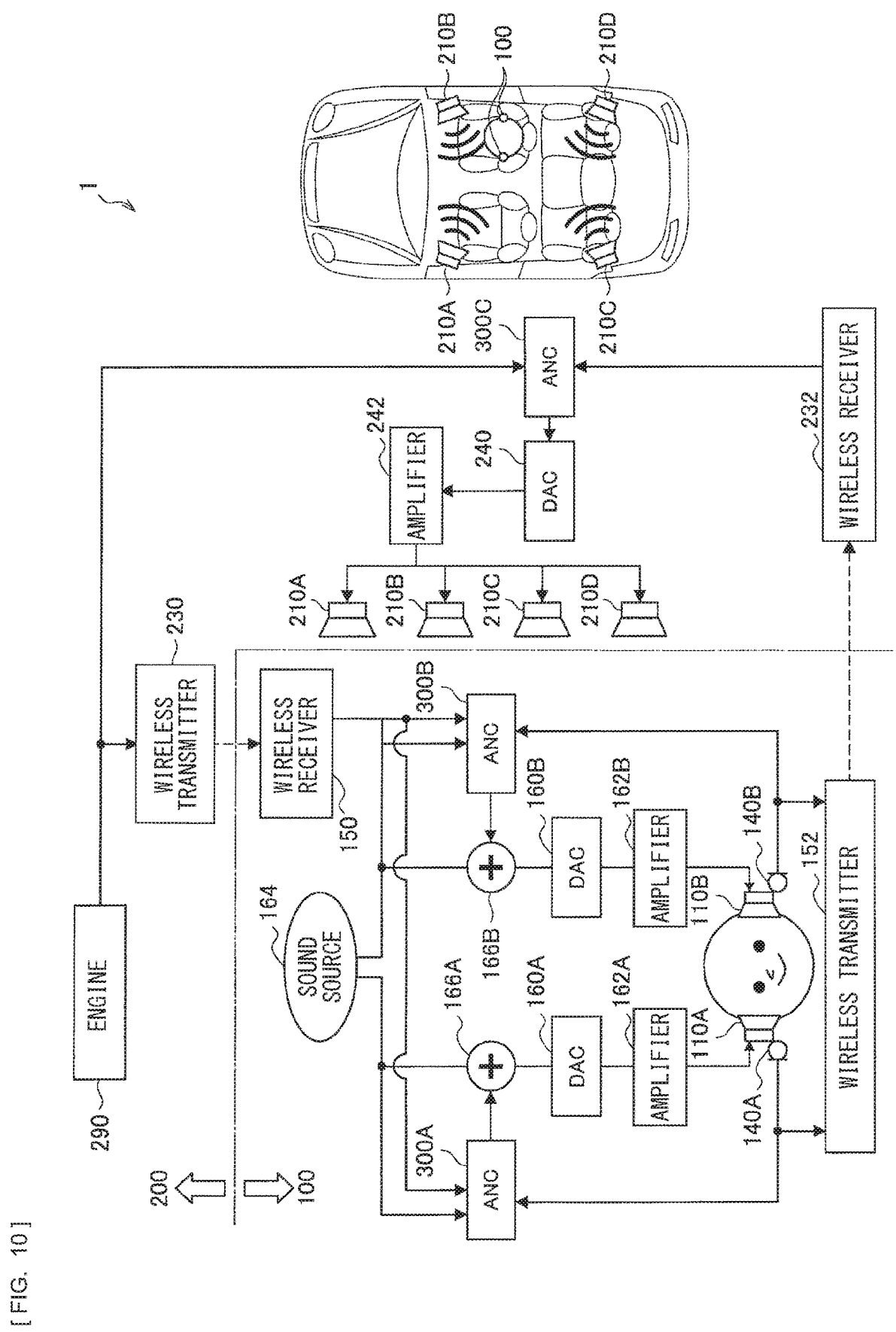
[FIG. 10]

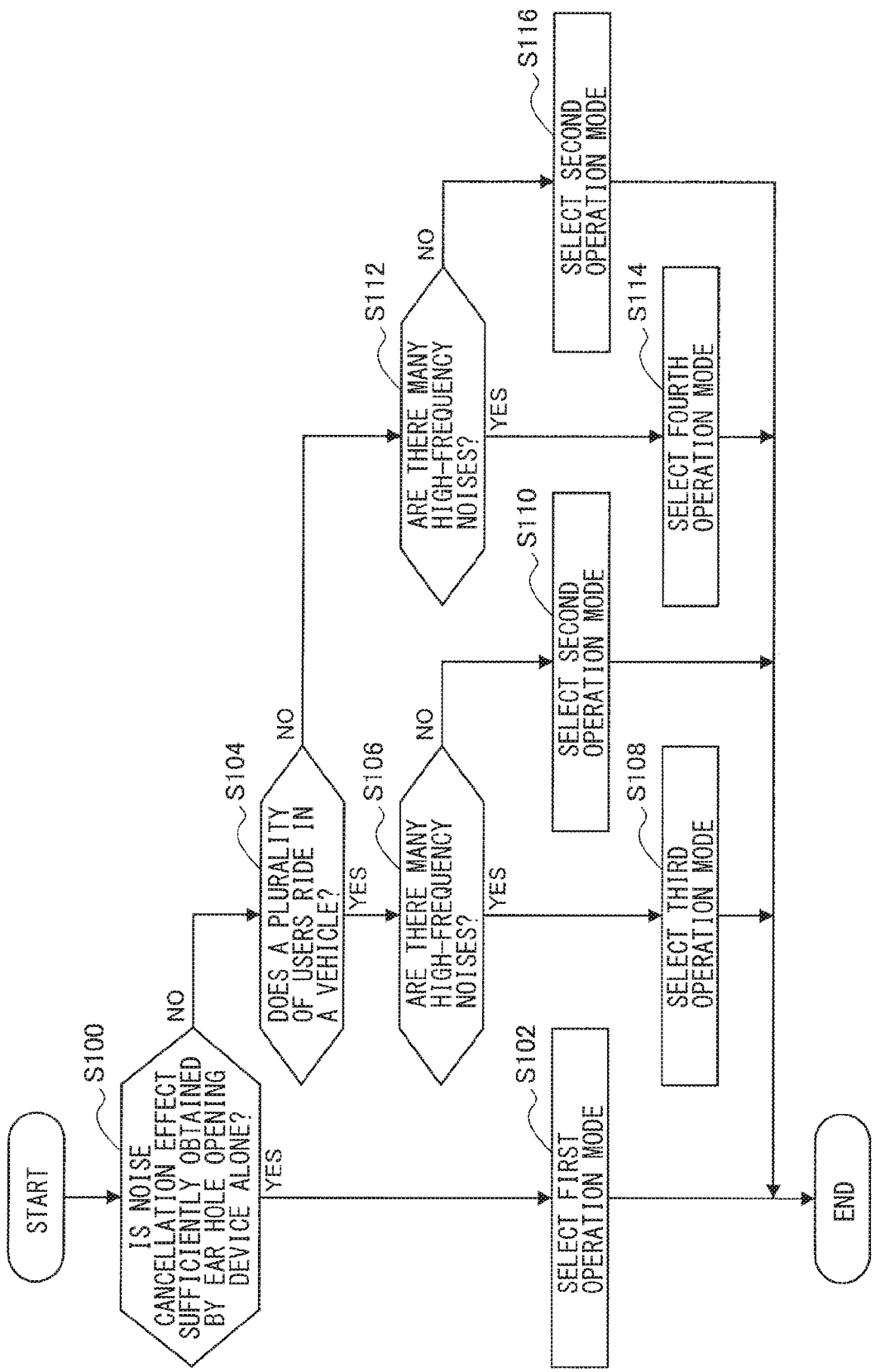
[FIG. 11]

[FIG. 12]
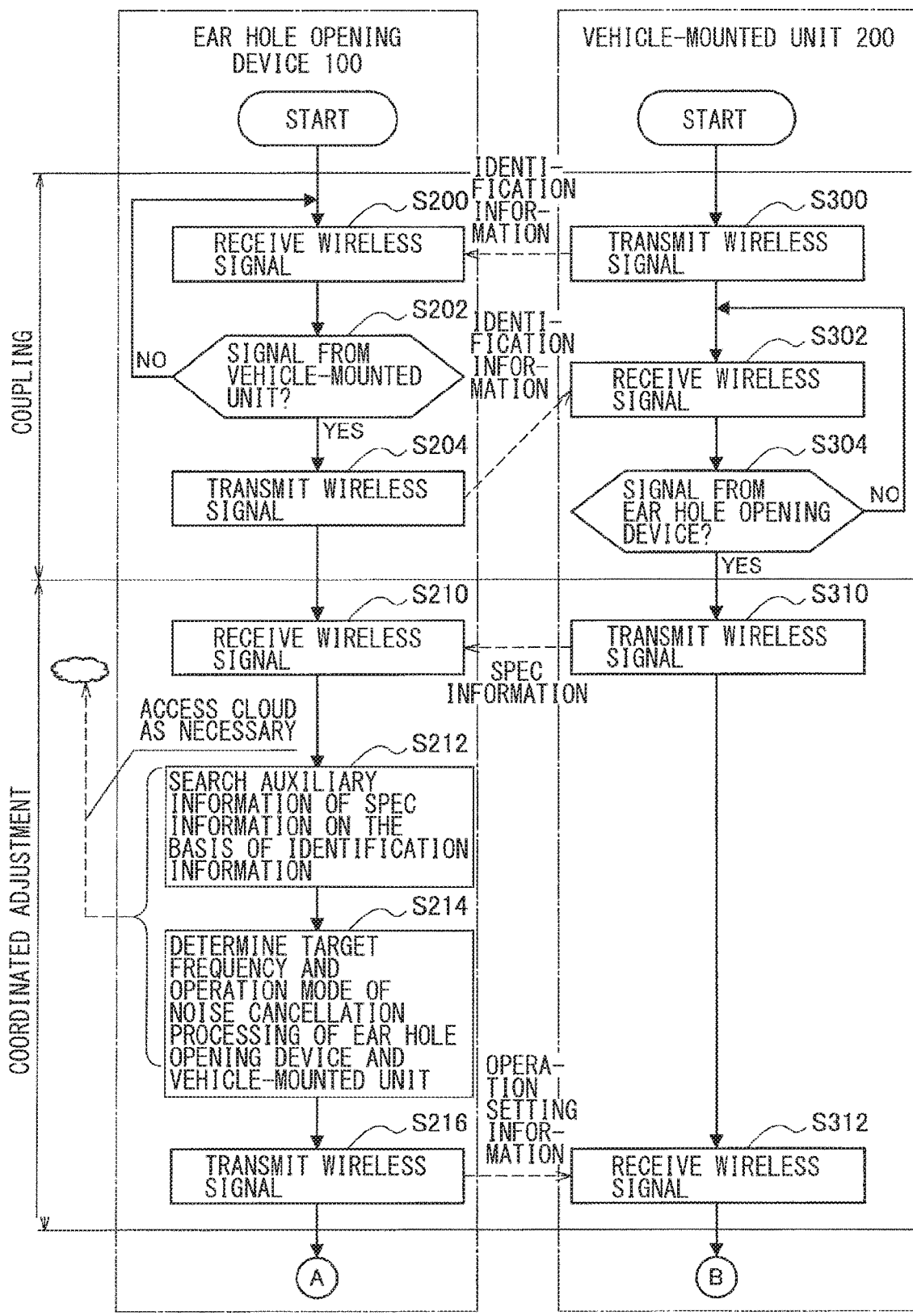

[FIG. 13]
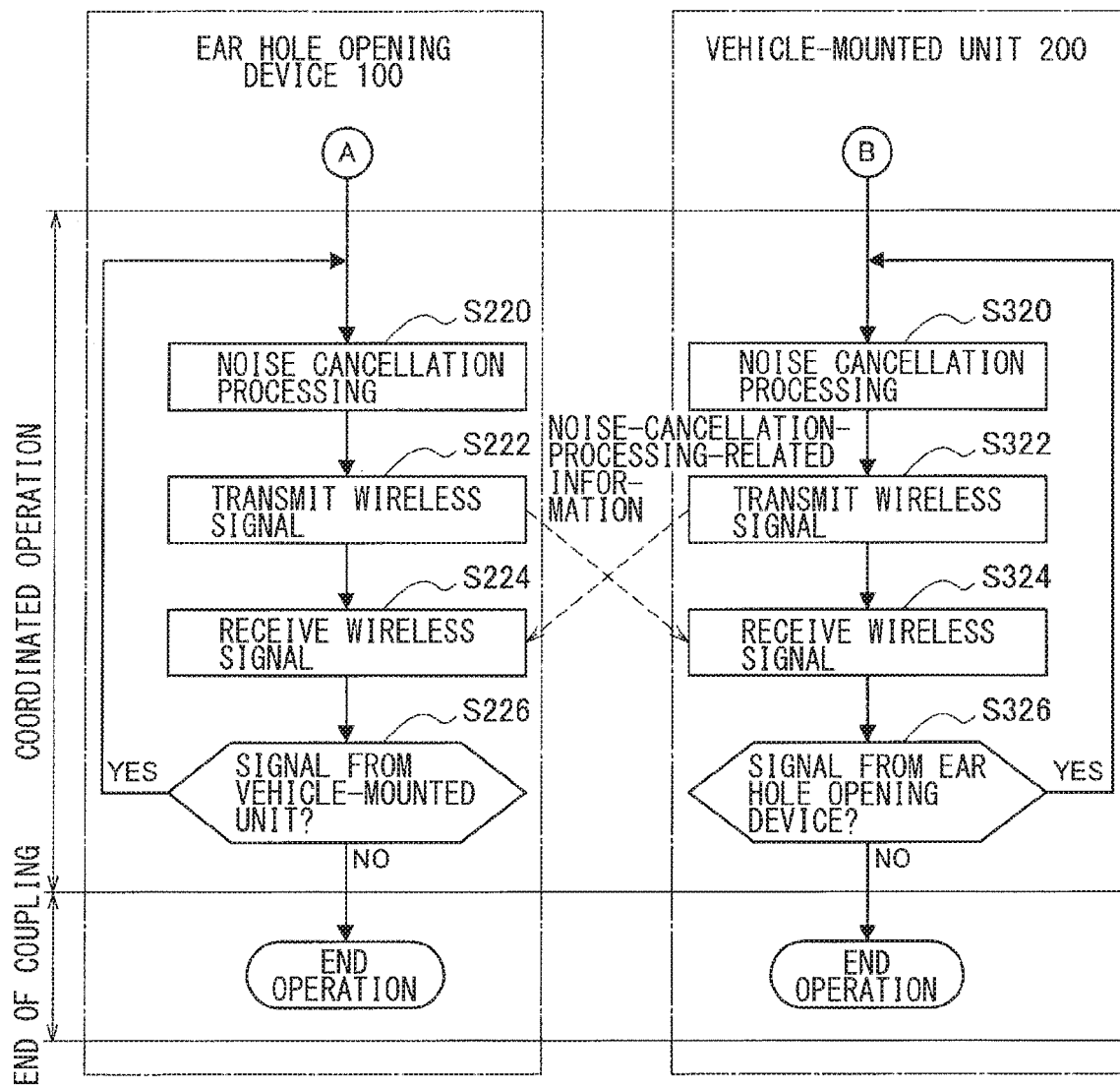

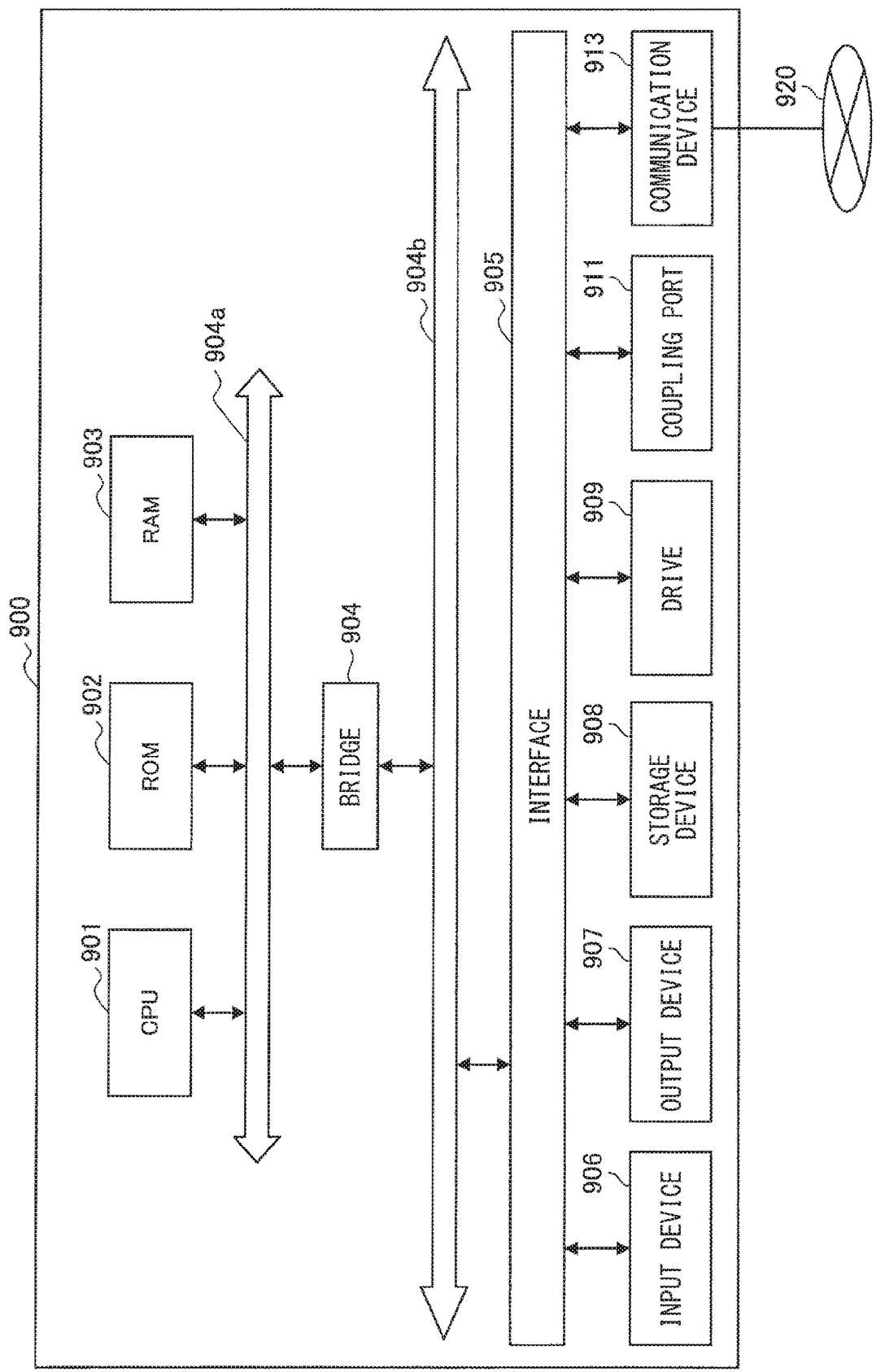
[FIG. 14]

INFORMATION PROCESSOR, INFORMATION PROCESSING SYSTEM, AND INFORMATION PROCESSING METHOD

CROSS REFERENCE TO RELATED APPLICATIONS

This application is a U.S. National Phase of International Patent Application No. PCT/JP2018/012078 filed on Mar. 26, 2018, which claims priority benefit of Japanese Patent Application No. JP 2017-125857 filed in the Japan Patent Office on Jun. 28, 2017. Each of the above-referenced applications is hereby incorporated herein by reference in its entirety.

TECHNICAL FIELD

The present disclosure relates to an information processor, an information processing system, an information processing method, and a program.

BACKGROUND ART

In recent years, a noise canceling (noise cancellation) technology has been widely developed. According to the noise canceling technology, obtaining acoustic characteristics of a noise allows for generation of an acoustic (audio) that offsets (i.e., cancels) the noise, thereby making it possible to cancel the noise. For example, PTL 1 listed below discloses a technique of stably canceling a noise by outputting an acoustic that cancels a noise from a plurality of speakers and applying an adaptive algorithm to a plurality of paths from the respective speakers to microphones.

Meanwhile, in recent years, various wearable devices have become widespread which are supposed to be constantly worn. For example, PTL 2 listed below discloses an ear hole opening type earphone. The ear hole opening type earphone is worn and used by a user similarly to a so-called earphone. However, the ear hole opening type earphone does not seal the ear hole in a state of being worn, thus allowing for achievement of listening characteristics of an ambient sound equivalent to listening characteristics at the time of non-wearing.

CITATION LIST

Patent Literature

PTL 1: Japanese Unexamined Patent Application Publication No. 2016-61868
PTL 2: International Publication No. WO 2016/067700

SUMMARY OF THE INVENTION

Problem to be Solved by the Invention

A wearable device having listening characteristics of an ambient sound equivalent to listening characteristics at the time of non-mounting as disclosed in the above-listed PTL 2 is greatly influenced by an ambient noise as compared with a typical hermetic earphone. Therefore, there may be a case where it is difficult to sufficiently cancel the noise only by a noise canceling technique as disclosed in the above-listed PTL 1.

Therefore, the present disclosure proposes a mechanism that allows for a higher noise cancellation effect by operating a plurality of units in coordination.

Means for Solving the Problem

According to the present disclosure, there is provided an information processor including a signal processing section that: acquires a first signal to be detected by an acoustic input section of a first unit including the acoustic input section disposed within a predetermined distance from one ear hole of a user in a state of being worn by the user; acquires a second signal, which indicates a noise generated from a noise source, to be acquired by a second unit; and generates a noise cancellation signal directed to the noise on the basis of the first signal and the second signal.

In addition, according to the present disclosure, there is provided an information processing system including: a first unit that includes an acoustic input section disposed within a predetermined distance from one ear hole of a user in a state of being worn by the user, and detects a first signal by the acoustic input section; a second unit that acquires a second signal indicating a noise generated from a noise source; and a third unit that generates a noise cancellation signal directed to the noise on the basis of the first signal and the second signal.

In addition, according to the present disclosure, there is provided an information processing method comprising: acquiring a first signal to be detected by an acoustic input section of a first unit including the acoustic input section disposed within a predetermined distance from one ear hole of a user in a state of being worn by the user; acquiring a second signal, which indicates a noise generated from a noise source, to be acquired by a second unit; and generating a noise cancellation signal directed to the noise on the basis of the first signal and the second signal by a processor.

In addition, according to the present disclosure, there is provided a program that causes a computer to serve as a signal processing section. The signal processing section acquires a first signal to be detected by an acoustic input section of a first unit including the acoustic input section disposed within a predetermined distance from one ear hole of a user in a state of being worn by the user; acquires a second signal, which indicates a noise generated from a noise source, to be acquired by a second unit; and generates a noise cancellation signal directed to the noise on the basis of the first signal and the second signal.

Effect of the Invention

As described above, according to the present disclosure, it is possible to provide a mechanism that allows for a higher noise cancellation effect by operating a plurality of units in coordination. It is to be noted that the above-described effects are not necessarily limitative. In addition to or in place of the above effects, there may be achieved any of the effects described in the present specification or other effects that may be grasped from the present specification.

BRIEF DESCRIPTION OF THE DRAWINGS

FIG. 1 is an explanatory diagram of an overview of a noise canceling system according to the present embodiment.

FIG. 2 is an explanatory diagram of an example of an external configuration of an ear hole opening device according to the present embodiment.

FIG. 3 is an explanatory diagram of an example of a configuration of the noise canceling system according to the present embodiment.

FIG. 4 is an explanatory diagram of noise cancellation processing directed to an engine sound, to be performed by an ANC according to the present embodiment.

FIG. 5 is an explanatory diagram of a specific example of noise cancellation processing directed to an engine sound, to be performed by a typical ANC.

FIG. 6 is an explanatory diagram of a first example of a first operation mode of the noise canceling system according to the present embodiment.

FIG. 7 is an explanatory diagram of a second example of the first operation mode of the noise canceling system according to the present embodiment.

FIG. 8 is an explanatory diagram of a second operation mode of the noise canceling system according to the present embodiment.

FIG. 9 is an explanatory diagram of a third operation mode of the noise canceling system according to the present embodiment.

FIG. 10 is an explanatory diagram of a fourth operation mode of the noise canceling system according to the present embodiment.

FIG. 11 is a flowchart illustrating an example of a flow of operation mode control processing to be executed by the ANC according to the present embodiment.

FIG. 12 is a sequence diagram that describes an example of a flow of coordinated operation processing between the ear hole opening device and a vehicle-mounted unit.

FIG. 13 is a sequence diagram that describes an example of the flow of the coordinated operation processing between the ear hole opening device and the vehicle-mounted unit.

FIG. 14 is a block diagram illustrating an example of a hardware configuration of an information processor according to the present embodiment.

MODES FOR CARRYING OUT THE INVENTION

Description is given below in detail of preferred embodiments of the present disclosure with reference to attached drawings. It is to be noted that, in the present specification and drawings, repeated description is omitted for components substantially having the same functional configuration by assigning the same reference numerals.

In addition, there is a case where, in the present specification and drawings, elements having substantially the same functional configuration may be denoted with the same reference numerals followed by different alphabets to distinguish the elements. For example, a plurality of elements having substantially the same functional configuration are distinguished as an ANC 300A and an ANC 300B as necessary. However, in a case where it is unnecessary to particularly distinguish among a plurality of elements having substantially the same functional configuration, only the same reference numerals are assigned. For example, in a case where it is unnecessary to particularly distinguish the ANC 300A and the ANC 300B from each other, they are simply referred to as an ANC 300.

It is to be noted that description is given in the following order.

1. Introduction
   1.1. Overview
   1.2. External Configuration of Ear Hole Opening Device
2. Configuration Example of Noise Canceling System
   2.1. Ear Hole Opening Device
   2.2. Vehicle-Mounted Unit
   2.3. ANC
3. flow of Processing
4. Configuration Example of Hardware
5. Conclusion

1. INTRODUCTION

1.1. Overview

FIG. 1 is an explanatory diagram of an overview of a noise canceling system 1 according to the present embodiment. A user leads a life while constantly wearing an ear hole opening device 100. The ear hole opening device 100 does not seal an ear hole in a state of being worn, thus allowing for achievement of listening characteristics of an ambient sound equivalent to listening characteristics at the time of non-wearing. Therefore, even when the ear hole opening device 100 is worn, the user is able to lead a life while listening to the ambient sound similarly to a case where the user does not wear the ear hole opening device 100. In the example illustrated in FIG. 1, the user walks while wearing the ear hole opening device 100, then gets into an automobile and drives, and leaves the automobile and relaxes at home.

The ear hole opening device 100 is able to cancel a noise alone or is able to cancel a noise in coordination with any other unit as well. In a case where the user is walking, for example, the ear hole opening device 100 performs noise cancellation processing using a speaker and a microphone provided in the ear hole opening device 100, i.e., using the ear hole opening device 100 alone. In a case where the user is driving an automobile, for example, the ear hole opening device 100 performs noise cancellation processing directed to an engine sound in coordination with the automobile. In a case where the user is relaxing at home, for example, the ear hole opening device 100 performs noise cancellation processing directed to a motor sound of a fan in a room in coordination with the fan.

As described above, the ear hole opening device 100 according to the present embodiment is able to cancel a noise in coordination with a surrounding unit in accordance with a life scene of the user.

1.2. External Configuration of Ear Hole Opening Device

FIG. 2 is an explanatory diagram of an example of an external configuration of the ear hole opening device according to the present embodiment. As illustrated in FIG. 2, the ear hole opening device 100 is used while being worn on one ear of a listener (i.e., a user).

As illustrated in FIG. 2, the ear hole opening device 100 includes an acoustic generator 110 that generates an acoustic, a sound conducting section 120 that takes in the acoustic generated by the acoustic generator 110 from one end 121, and a holding section 130 that holds the sound conducting section 120 near another end 122. The sound conducting section 120 includes a hollow tube material, both ends of which are open ends. The one end 121 of the sound conducting section 120 is an acoustic input hole for a generated sound from the acoustic generator 110, and the other end 122 is an acoustic output hole therefor. Accordingly, the one end 121 is attached to the acoustic generator 110, whereby the sound conducting section 120 is in an open state on one side.

The holding section 130 engages with the vicinity of an entrance of ear canal (e.g., intertragic notch), and supports the sound conducting section 120 in the vicinity of the other end 122 to allow the acoustic output hole of the other end 122 of the sound conducting section 120 to face back side of the ear canal. An outer diameter of the sound conducting section 120 at least in the vicinity of the other end 122 is formed to be much smaller than an inner diameter of the ear hole. Accordingly, even in a state where the other end 122 of the sound conducting section 120 is held by the holding section 130 in the vicinity of the entrance of the ear canal, the ear hole of the listener is not blocked. That is, the ear hole is open. Unlike a typical earphone, the ear hole opening device 100 is said to be an ear hole opening type earphone.

In addition, the holding section 130 has an opening 131 that causes the entrance (ear hole) of the ear canal to be open to the outside even in a state where the holding section 130 holds the sound conducting section 120. In the example illustrated in FIG. 2, the holding section 130 is a ring-shaped structure, and an acoustic input section 140 is provided at a part where a rod-shaped support member 132 provided in a ring inner direction joins in the vicinity of a ring center, with all other parts of the ring-shaped structure being the opening 131. It is to be noted that the holding section 130 is not limited to the ring-shaped structure, and may have any shape that supports the other end 122 of the sound conducting section 120 and is provided with the acoustic input section 140 as long as the holding section 130 has a hollow structure.

In a case where the acoustic generated from the acoustic generator 110 is taken into the tube from the one end 121, the tube-shaped sound conducting section 120 propagates air vibration of the acoustic, and radiates the air vibration from the other end 122 held in the vicinity of the entrance of the ear canal by the holding section 130 toward the ear canal to transmit the radiated air vibration to a tympanic membrane.

As described above, the holding section 130 that holds the vicinity of the other end 122 of the sound conducting section 120 has the opening 131 that causes the entrance (ear hole) of the ear canal to be open to the outside. Accordingly, even in a state where the ear hole opening device 100 is worn, the ear hole of the listener is not blocked. The listener is able to sufficiently listen to an ambient sound through the opening 131 even during listening to the acoustic outputted from the acoustic generator 110 by wearing the ear hole opening device 100.

In addition, the ear hole opening device 100 according to the present embodiment opens the ear hole, but is able to prevent the sound generated from the acoustic generator 110 (i.e., a reproduced sound) from leaking to the outside. One reason for this is that the other end 122 of the sound conducting section 120 is attached to face the back of the ear canal in the vicinity of the entrance of the ear canal, thus enabling sufficient sound quality to be obtained even when an output of the acoustic generator 110 is small. In addition, a directivity of the air vibration radiated from the other end 122 of the sound conducting section 120 may also contribute to prevention of the sound leakage.

The sound conducting section 120 has, at its middle part, a bent shape that is folded back from rear surface side to front surface side of the auricle. The bent part is a pinch section 123 having an opening/closing structure; generating a pinching force to pinch an ear lobe makes it possible to maintain the attachment of the ear hole opening device 100 to the listener.

The acoustic input section 140 provided in the vicinity of the ring center of the ring-shaped holding section 130 is provided to face side opposite to the tympanic membrane, and mainly detects (i.e., collects) an ambient sound. That is, the acoustic input section 140 is so provided as to face in a direction opposite to the other end 122 that is so disposed as to face the back side of the ear canal. Therefore, the influence of the generated sound from the acoustic generator 110 outputted from the other end 122 on a detection result by the acoustic input section 140 is reduced.

The acoustic input section 140 serves as a so-called error microphone for noise cancellation, and the detection result by the acoustic input section 140 is treated as an error signal. The acoustic input section 140 is disposed in the vicinity of the ear hole, i.e., in the vicinity of the tympanic membrane, and thus high noise cancellation accuracy is expected.

It is to be noted that the ear hole opening device 100 illustrated in FIG. 2 is configured on the assumption that the ear hole opening device 100 is worn on the right ear, but the ear hole opening device 100 to be worn on the left ear is configured to be bilaterally symmetrical with the ear hole opening device 100 for the right ear. Further, the ear hole opening device 100 may also be configured for both ears, including those both for the right ear and for the left ear.

2. CONFIGURATION EXAMPLE OF NOISE CANCELING SYSTEM

FIG. 3 is an explanatory diagram of an example of a configuration of the noise canceling system 1 according to the present embodiment. As illustrated in FIG. 3, the noise canceling system 1 according to the present embodiment includes the ear hole opening device 100, a vehicle-mounted unit 200, and the ANC (Active Noise Canceller) 300.

2.1. Configuration Example of Ear Hole Opening Device

The ear hole opening device 100 is a device that is worn by a user to input and output an acoustic. The ear hole opening device 100 according to the present embodiment corresponds to a first unit. As described with reference to FIG. 1, the ear hole opening device 100 includes the acoustic input section 140 disposed within a predetermined distance from one ear hole of the user in a state of being worn by the user. In a case where the ear hole opening device 100 is configured for binaural use, in a state of being worn by the user, the ear hole opening device 100 includes an acoustic input section 140A for the right ear disposed within a predetermined distance from the right ear hole of the user, and an acoustic input section 140B for the left ear disposed within a predetermined distance from the left ear hole. In addition, as described with reference to FIG. 1, the ear hole opening device 100 includes the acoustic generator 110 disposed within a predetermined distance from one ear hole of the user in a state of being worn by the user. In a case where the ear hole opening device 100 is configured for both ears, in a state of being worn by the user, the ear hole opening device 100 includes an acoustic generator 110A for the right ear disposed within a predetermined distance from the right ear hole of the user, and an acoustic generator 110B for the left ear disposed within a predetermined distance from the left ear hole. The disposition within a predetermined distance from the ear hole may be viewed as disposition within a predetermined distance from the tympanic membrane or disposition in the vicinity of the entrance of the ear canal.

The acoustic input section 140 includes a microphone (hereinafter, also simply referred to as a mic) that detects an ambient sound, and generates an acoustic signal (hereinafter, also referred to as a first signal) indicating a detection result by the microphone. The acoustic input section 140 may include a microphone amplifier circuit that performs amplification processing of an acoustic signal obtained by the microphone, an ADC (Analog Digital Converter) that converts an analog signal to a digital signal, and a signal processing circuit that performs processing such as noise cancellation and sound source separation.

The acoustic generator 110 is a first acoustic output section that outputs an acoustic signal. The acoustic generator 110 may include a DAC (Digital Analog Converter) and an amplifier, and converts the acoustic signal from a digital signal to an analog signal and outputs (i.e., reproduces) the converted analog signal. For example, the acoustic generator 110 outputs a noise cancellation signal generated by the ANC 300. In addition, the ear hole opening device 100 may have a content reproduction function, and may output an acoustic signal acquired, for example, from a sound source out of the acoustic generator 110.

2.2. Configuration Example of Vehicle-Mounted Unit

The vehicle-mounted unit 200 is an example of a unit that manages a noise source. The vehicle-mounted unit 200 according to the present embodiment corresponds to a second unit. The vehicle-mounted unit 200 acquires a signal indicating a noise (hereinafter, also referred to as a second signal) generated from a noise source. The second signal is information on a frequency of the noise generated from the noise source. For example, the noise source includes a moving body that performs rotational movement, the noise is a noise associated with the rotational movement, and the second signal is information indicating the number of rotations of the rotational movement. Specifically, the noise source may be a vehicle power source, such as an internal combustion engine (i.e., engine) or a motor. It is to be noted that the information indicating the number of rotations of the power source may be information indicating the number of rotations, itself, or may be information related to the number of rotations of a crank pulse, etc. Typically, the vehicle-mounted unit 200 is integrated with the noise source, for example, included in the same housing. In the present specification, it is assumed that the noise source is an engine, and the vehicle-mounted unit 200 is mounted on an automobile mounted with the engine.

The vehicle-mounted unit 200 includes an acoustic input section (corresponding to an in-vehicle microphone 220 described later) that detects sound in a vehicle interior and generates an acoustic signal indicating a detection result. The acoustic input section may include a microphone amplifier circuit that performs amplification processing of an acoustic signal obtained by the microphone, an ADC that converts an analog signal to a digital signal, and a signal processing circuit that performs processing such as noise cancellation and sound source separation.

The vehicle-mounted unit 200 includes a second acoustic output section (corresponding to an in-vehicle speaker 210 described later) that outputs an acoustic signal. The second acoustic output section converts the acoustic signal from a digital signal to an analog signal via the DAC (Digital Analog Converter) and an amplifier, and outputs (i.e., reproduces) the converted analog signal. For example, the vehicle-mounted unit 200 outputs a noise cancellation signal generated by the ANC 300. In addition, the vehicle-mounted unit 200 may have a content reproduction function, and may output an acoustic signal acquired, for example, from a sound source out of the second acoustic output section. The second acoustic output section is achieved by, for example, a door woofer for automobile in-vehicle audio application. Alternatively, the second acoustic output section may be disposed close to the ear of an occupant in the headrest of the seat, or may be disposed at the ceiling.

2.3. Configuration Example of ANC

The ANC 300 is a unit that generates a noise cancellation signal. The ANC 300 according to the present embodiment corresponds to a third unit. The ANC 300 according to the present embodiment corresponds to a third unit. As illustrated in FIG. 3, the ANC 300 includes an acquisition section 310, a signal processing section 320, and an operation mode control section 330.

Acquisition Section 310

The acquisition section 310 acquires a first signal from the ear hole opening device 100, and acquires a second signal from the vehicle-mounted unit 200. The acquisition section 310 may be achieved by a wired or wireless communication interface, and acquires the first signal or the second signal via a wired communication path or a wireless communication path.

The ANC 300 may be integrated with the ear hole opening device 100 or included in the ear hole opening device 100. In such a case, the ANC 300 acquires the first signal via the wired communication path. Meanwhile, the ANC 300 acquires the second signals via the wireless communication path. Such a wireless communication path is established in conformity to any wireless communication standard such as LTE, Wi-Fi (registered trademark), Bluetooth (registered trademark), BLE (Bluetooth Low Energy; registered trademark), NFC (Near Field Communication), or ZigBee (registered trademark).

The ANC 300 may be integrated with the vehicle-mounted unit 200 or included in the vehicle-mounted unit 200. In such a case, the ANC 300 acquires the first signal via the wireless communication path. Such a wireless communication path is established in conformity to any wireless communication standard. Meanwhile, the ANC 300 acquires the second signal via the wired communication path. Such a wired communication path is, for example, CAN (Controller Area Network)-BUS.

Signal Processing Section 320

The signal processing section 320 generates a noise cancellation signal directed to a noise generated from a noise source on the basis of the first signal and the second signal acquired by the acquisition section 310. For example, the signal processing section 320 generates a noise cancellation signal by generating a reference signal on the basis of the second signal using the first signal as an error signal and by performing an AFF (Adaptive Feedforward) noise cancellation processing. Here, the reference signal is an acoustic signal of a noise to be detected by a so-called reference microphone in typical AFF noise cancellation processing. Even in a case where a frequency of a noise fluctuates in accordance with fluctuation in the number of rotations of the engine, or the like, the AFF noise cancellation processing makes it possible to continuously cancel the noise by causing filter characteristic to follow the fluctuation.

Description is given of the noise cancellation processing by the ANC 300 with reference to FIG. 4.

FIG. 4 is an explanatory diagram of noise cancellation processing directed to an engine sound, to be performed by the ANC 300 according to the present embodiment. The ANC 300 determines a target frequency on the basis of the second signal indicating the number of rotations of an engine 290, and generates a sine wave of the target frequency. The sine wave of the target frequency corresponds to the reference signal to be detected by the so-called reference microphone.

The ANC 300 sets a filter coefficient of a variable filter. In particular, an adaptive algorithm calculates the filter coefficient using the adaptive algorithm on the basis of the first signal, the reference signal, and an estimated value of an acoustic transfer characteristic H. Then, the ANC 300 sequentially rewrites the filter coefficient of the variable filter to a filter coefficient calculated by the adaptive algorithm. It is to be noted that examples of the adaptive algorithm that may be used include LMS (Least Mean Square). In addition, the acoustic transfer characteristic H is an acoustic transfer characteristic of a secondary path that is a transmission path from a speaker (e.g., the acoustic generator 110), from which a noise cancellation signal is outputted, to an error microphone (e.g., the acoustic input section 140).

The variable filter generates a noise cancellation signal by applying (i.e., convolving) the filter coefficient set by the adaptive algorithm to the reference signal. The generated signal is outputted from the speaker, and a noise from the engine is canceled at the position of the error microphone.

Next, description is given, with reference to FIG. 5, of noise cancellation processing to be performed by a typical in-vehicle ANC using an in-vehicle speaker and a microphone.

FIG. 5 is an explanatory diagram of a specific example of noise cancellation processing directed to an engine sound, to be performed by the typical in-vehicle ANC. As illustrated in FIG. 5, in-vehicle speakers 210A to 210D and in-vehicle microphones 220A to 220D are provided in the vehicle interior. An ANC 250 generates a noise cancellation signal on the basis of the error signals detected by the in-vehicle microphones 220A to 220D and the reference signal obtained from the engine, and outputs the noise cancellation signal from the in-vehicle speakers 210A to 210D. As the in-vehicle speakers 210A to 210D, the door woofers for in-vehicle audio application are able to be used. In addition, a noise is cancelled in the vicinity of the in-vehicle microphones 220A to 220D, and thus it is desirable for the in-vehicle microphones 220A to 220D to be disposed close to the ear of the occupant, such as in the vicinity of the headrest or at the ceiling.

The in-vehicle ANC illustrated in FIG. 5 differs from the ANC 300 according to the present embodiment in that an error signal is acquired by the in-vehicle microphone 220. In the example illustrated in FIG. 5, the ANC 300 generates a noise cancellation signal on the basis of the error signal acquired by the acoustic input section 140 instead of the in-vehicle microphone 220.

An output signal is generated on the basis of the noise cancellation signal. The output signal is one or both of a noise cancellation signal and a signal in which the noise cancellation signal and a signal resulting from application of predetermined signal processing to an acoustic signal generated from a sound source are synthesized. As the predetermined signal processing, for example, sound image localization processing may be applied. The sound image localization processing is processing that achieves sound image localization to an arbitrary place by convolving, on a time axis, a head acoustic transfer function (HRTF: Head-Related Transfer Function) of each ear for a target sound image position with respect to an acoustic signal. In a case where an output signal is generated on the basis of a synthesized signal in which the noise cancellation signal and the acoustic signal generated from the sound source are synthesized, the user is able to have a noise cancellation effect while enjoying a content. It is to be noted that examples of the sound source include music, wireless audio, call audio, and navigation audio. The generation of the output signal may be performed by the ANC 300, or may be performed by the ear hole opening device 100 or the vehicle-mounted unit 200.

The output signal is outputted by one or both of the first acoustic output section of the ear hole opening device 100 and the second acoustic output section of the vehicle-mounted unit 200. In a case where the output signal is outputted from the ear hole opening device 100, the noise cancellation signal is outputted from the vicinity of the tympanic membrane, thus making it possible to achieve a high noise cancellation effect. Meanwhile, in a case where the output signal is outputted from the vehicle-mounted unit 200, the output signal is outputted from a speaker having a large diameter for music reproduction, such as a door woofer. Therefore, it is possible to cancel the noise more effectively particularly in a low frequency range.

In a case where another device has a noise cancellation function, the signal processing section 320 exchanges information on noise cancellation capability with the other device. For example, in a case where the ear hole opening device 100 includes the ANC 300A and the vehicle-mounted unit 200 includes the ANC 300B, the information on the noise cancellation capability is exchanged between the ear hole opening device 100 and the vehicle-mounted unit 200, i.e., between the ANC 300A and the ANC 300B. Examples of the information on the noise cancellation capability include spec information such as an operable frequency, a size of a diameter of a speaker, and a maximum volume. In addition, operation setting information such as a target frequency of the noise cancellation processing, and information related to a cancellation amount of a noise by noise cancellation processing being executed or information related to noise cancellation processing of trouble information, etc. may be exchanged. Such exchanges of the information enable the ANC 300 to efficiently cancel noises in coordination with other units.

The signal processing section 320 may control a frequency to be subjected to the noise cancellation processing or a magnitude (i.e., amplitude) of the noise cancellation signal. For example, the signal processing section 320 excludes, from the noise cancellation subject, a frequency band of a sound which should be noticed by the user, such as a navigation audio or a warning sound, among ambient sounds. This enables the user to notice the sound which should be noticed.

Operation Mode Control Section 330

The operation mode control section 330 selects an operation mode of the signal processing section 320 from a plurality of operation modes having different coordinated operations with other units. A plurality of operation mode groups include the plurality of operation modes having different coordinated operations between the ANC 300 and the ear hole opening device 100 as well as the vehicle-mounted unit 200. The variation of the operation mode is described in detail later. Selection of an appropriate operation mode from among the plurality of operation modes enables the ANC 300 to exhibit a high noise cancellation effect in accordance with circumstances.

In a case where the noise source is the power source of the vehicle, the operation mode control section 330 may select an operation mode in accordance with whether or not the user has entered the vehicle interior. For example, in a case where the user is outside the vehicle interior, the operation mode control section 330 selects an operation mode in which the ear hole opening device 100 does not coordinate with the vehicle-mounted unit 200. Meanwhile, in a case where the user is in the vehicle interior, the operation mode control section 330 selects an operation mode in which the ear hole opening device 100 and the vehicle-mounted unit 200 perform a coordinated operation (e.g., first to fourth operation modes described later). Selection of such an operation mode makes it possible to change the operation mode seamlessly in a situation, for example, where the user walks to an automobile in a state of wearing the ear hole opening device 100, gets into the automobile and drives, and then leaves the automobile and walks.

The operation mode control section 330 may select an operation mode in accordance with a quantity of high-frequency components of a noise. For example, in a case where there is less high-frequency noise, the operation mode control section 330 selects an operation mode (e.g., a second operation mode described later) in which the vehicle-mounted unit 200 outputs an output signal. Meanwhile, in a case where there are many high-frequency noises, the operation mode control section 330 selects an operation mode (e.g., the third or fourth operation mode described later) in which an output signal is outputted on side of the ear hole opening device 100. Such a selection makes it possible to effectively cancel the high-frequency noise and the low-frequency noise. Description is given in detail later of effective cancellation of the high-frequency noise by the output of the output signal from the ear hole opening device 100 and of effective cancellation of the low-frequency noise by the output of the output signal from the vehicle-mounted unit 200.

The operation mode control section 330 may select an operation mode in accordance with the number of people in the vehicle interior of the vehicle. For example, in a case where there are a plurality of users who wear the ear hole opening device 100 in the vehicle interior, the operation mode control section 330 selects an operation mode in which the amount of wireless communication between the ear hole opening device 100 and the vehicle-mounted unit 200 is small (e.g., the third operation mode described later). Meanwhile, in a case where there is one user who wears the ear hole opening device 100 in the vehicle interior, the operation mode control section 330 selects an operation mode in which the amount of wireless communication between the ear hole opening device 100 and the vehicle-mounted unit 200 is large (e.g., the fourth operation mode described later). This enables the ANC 300 to perform noise cancellation, with delay of the wireless communication being taken into consideration.

Hereinafter, description is given of an example of a specific operation mode. In the following description, it is assumed that the component with the hundreds place being 1 is a component of the ear hole opening device 100, and the component with the hundreds place being 2 is a component of the vehicle-mounted unit 200.

(1) First Operation Mode

The present operation mode is a mode in which an output signal is outputted by the acoustic generator 110 of the ear hole opening device 100.

First Example

FIG. 6 is an explanatory diagram of a first example of the first operation mode of the noise canceling system 1 according to the present embodiment. In the operation mode illustrated in FIG. 6, the ANC 300 provided in the ear hole opening device 100 operates. In FIG. 6, as for the components of the ear hole opening device 100, the same components are denoted with the same reference numerals followed by different alphabets to distinguish between the components for the right ear and for the left ear. The component with the alphabet A performs processing for the right ear, and the component with the alphabet B performs processing for the left ear. It is assumed that the user who wears the ear hole opening device 100 is in the vehicle interior of the automobile mounted with the vehicle-mounted unit 200.

A wireless transmitter 230 of the vehicle-mounted unit 200 acquires the second signal from the engine 290 and transmits the acquired second signal to the ear hole opening device 100 via a wireless communication path (i.e., wireless transmission).

A wireless receiver 150 of the ear hole opening device 100 receives the second signal transmitted from the vehicle-mounted unit 200, and outputs the second signal to the ANC 300A and the ANC 300B. Description is given below of processing for the right ear.

The acoustic input section 140A detects the first signal and outputs the detected first signal to the ANC 300A.

The ANC 300A acquires the first signal and the second signal. Here, the ANC 300A acquires the first signals via a path (corresponding to a first path) not including the wireless communication path. The ANC 300A acquires the second signals via a path (corresponding to a second path) including the wireless communication path. Further, the ANC 300A generates a noise cancellation signal on the basis of the first signal and the second signal.

An output signal is generated on the basis of the noise cancellation signal generated by the ANC 300A. In the example illustrated in FIG. 6, in the ear hole opening device 100, the DAC160A converts the noise cancellation signal from a digital signal to an analog signal, and the amplifier 162A amplifies the converted analog signal to generate an output signal. The output signal thus generated is outputted by the acoustic generator 110A.

The description has been given above of the processing on right ear side. The processing on left ear side is also similar, and thus a detailed description thereof is omitted here.

According to the present operation mode, the ANC 300 acquires the second signal on the path including the wireless communication path. The second signal is information indicating the number of rotations of the engine 290, and has less amount of data than that of the reference signal. Accordingly, the ANC 300 is less susceptible to wireless delay than a case where the reference signal is transmitted wirelessly. Further, the number of rotations of the engine 290 is predictable to some extent, and fluctuates relatively gently. Therefore, even in a case of wireless delay, the ANC 300 generates the noise cancellation signal while predicting fluctuation in the number of rotations of the engine 290, thereby making it possible to maintain the noise cancellation effect.

Second Example

FIG. 7 is an explanatory diagram of a second example of the first operation mode of the noise canceling system 1 according to the present embodiment. In the example illustrated in FIG. 7, the ear hole opening device 100 has a content reproduction function. It is assumed that the user who wears the ear hole opening device 100 is in the vehicle interior of the automobile mounted with the vehicle-mounted unit 200.

An acoustic signal generated from a sound source 164 is outputted to the ANC 300A and the ANC 300B and adders 166A and 166B. Hereinafter, description is given of processing on the right ear side.

The acoustic input section 140A detects the first signal and outputs the detected first signal to the ANC 300A.

The ANC 300A acquires the first signal and the second signal. Here, the ANC 300A acquires the first signal via a path (corresponding to the first path) not including the wireless communication path. The ANC 300A acquires the second signal via a path (corresponding to the second path) including the wireless communication path. The ANC 300A then generates a noise cancellation signal on the basis of the first signal and the second signal.

In particular, the ANC 300A generates a noise cancellation signal on the basis of the acoustic signal generated from the sound source 164 in addition to the first signal and the second signal. For example, the ANC 300A cancels, out of the first signal, a component (i.e., a wraparound component) of the acoustic signal generated from the sound source 164, and generates the noise cancellation signal on the basis of the first signal and the second signal after the cancellation of the wraparound component. This enables the ANC 300A to eliminate the influence of the contents on the noise cancellation processing.

An output signal is generated on the basis of the noise cancellation signal generated by the ANC 300A. In the example illustrated in FIG. 7, the ear hole opening device 100 first synthesizes the noise cancellation signal outputted from the ANC 300A and the acoustic signal generated from the sound source 164 by the adder 166A. Then, in the ear hole opening device 100, the DAC160A converts such a synthesized signal from a digital signal to an analog signal, and the amplifier 162A amplifies the converted analog signal to generate an output signal. The output signal thus generated is outputted by the acoustic generator 110A.

The description has been given above of processing on the right ear side. Processing on the left ear side is similar, and thus a detailed description thereof is omitted here.

According to the present operation mode, an output signal is generated on the basis of the synthesized signal in which the noise cancellation signal and the acoustic signal generated from the sound source are synthesized. Therefore, the user is able to have the noise cancellation effect while enjoying the content.

For example, in a case where the user who wears the ear hole opening device 100 gets into the vehicle interior of the automobile while reproducing the sound source, the operation described with reference to FIG. 7 is started manually or automatically in coordination with a device (such as a sensor not illustrated) that recognizes that the user has entered the vehicle interior of the automobile (or is in the vehicle interior). Such switching of the operation enables the user to seamlessly have the noise cancellation effect without operating the ear hole opening device 100 or stopping the content being reproduced.

(2) Secondary Operation Mode

The present operation mode is a mode in which an output signal is outputted by the in-vehicle speaker 210 of the vehicle-mounted unit 200.

FIG. 8 is an explanatory diagram of the second operation mode of the noise canceling system 1 according to the present embodiment. In the example illustrated in FIG. 8, the ANC 300 provided in the vehicle-mounted unit 200 operates. In FIG. 8, as for the components of the ear hole opening device 100, the same components are denoted with the same reference numerals followed by different alphabets to distinguish between the components for the right ear and for the left ear. The component with the alphabet A performs processing for the right ear, and the component with the alphabet B performs processing for the left ear. It is to be noted that the processing by the ear hole opening device 100 is described with respect to processing on the right ear side, and description of processing on the left ear side is omitted because it is similar to the processing on the right ear side. It is assumed that the user who wears the ear hole opening device 100 is in the vehicle interior of the automobile mounted with the vehicle-mounted unit 200.

In the ear hole opening device 100, the DAC160A converts an acoustic signal generated from the sound source 164 from a digital signal to an analog signal, and the amplifier 162A amplifies the converted analog signal to output the amplified signal out of the acoustic generator 110A.

The acoustic input section 140A detects the first signal and outputs the detected first signal to a wireless transmitter 152.

The wireless transmitter 152 transmits the first signal in two channels detected by the acoustic input sections 140A and 140B to the vehicle-mounted unit 200 via a wireless communication path (i.e., wireless transmission). Preferably, the ear hole opening device 100 cancels the component (i.e., the wraparound component) of the acoustic signal generated from the sound source 164, out of the first signal detected by the acoustic input section 140, and then wirelessly transmits the canceled component. This makes it possible to eliminate the influence of the contents on the noise cancellation processing by the ANC 300.

A wireless receiver 232 of the vehicle-mounted unit 200 receives the first signal transmitted from the ear hole opening device 100, and outputs the received first signal to the ANC 300. In addition, the second signal indicating the number of rotations of the engine 290 is outputted to the ANC 300.

The ANC 300 acquires the first signal and the second signal. Here, the ANC 300 acquires the first signal via a path (corresponding to a third path) including the wireless communication path. The ANC 300 acquires the second signal via a path (corresponding to a fourth path) not including the wireless communication path. The ANC 300 then generates a noise cancellation signal on the basis of the first signal and the second signal.

An output signal is generated on the basis of the noise cancellation signal generated by the ANC 300. In the example illustrated in FIG. 7, in the vehicle-mounted unit 200, a DAC 240 converts the noise cancellation signal from a digital signal to an analog signal, and an amplifier 242 amplifies the converted analog signal to generate an output signal. The output signal thus generated is outputted by each of the in-vehicle speakers 210A to 210D.

According to the present operation mode, the acoustic input section 140 of the ear hole opening device 100 which is closer to the tympanic membrane of the user than the in-vehicle microphone serves as an error microphone. Therefore, the present arrangement makes it possible to achieve a higher noise cancellation effect than that of the example illustrated in FIG. 5.

(3) Third Operation Mode

The present operation mode is a mode in which the acoustic input section 140 and the in-vehicle microphone 220 are used as error microphones, and the acoustic generator 110 and the in-vehicle speaker 210 each output an output signal on the basis of the noise cancellation signal. In particular, in the present operation mode, the ear hole opening device 100 and the vehicle-mounted unit 200 share frequency bands, and each perform noise cancellation processing.

FIG. 9 is an explanatory diagram of a third operation mode of the noise canceling system 1 according to the present embodiment. In the operation mode illustrated in FIG. 9, the ANC 300A and the ANC 300B provided in the ear hole opening device 100 and the ANC 250 provided in the vehicle-mounted unit 200 operate. In FIG. 9, as for the components of the ear hole opening device 100, the same components are denoted with the same reference numerals followed by different alphabets to distinguish between the components for the right ear and for the left ear. The component with the alphabet A performs processing for the right ear, and the component with the alphabet B performs processing for the left ear. It is assumed that the user who wears the ear hole opening device 100 is in the vehicle interior of the automobile mounted with the vehicle-mounted unit 200.

The wireless transmitter 230 of the vehicle-mounted unit 200 acquires the second signal from the engine 290 and transmits the acquired second signal to the ear hole opening device 100 via a wireless communication path (i.e., wireless transmission). In addition, the second signal indicating the number of rotations of the engine 290 is outputted to the ANC 250.

The in-vehicle microphones 220A to 220D of the vehicle-mounted unit 200 each detect an ambient sound, and generate an acoustic signal (hereinafter, also referred to as a third signal) indicating a detection result. The in-vehicle microphones 220A to 220D may each include a microphone amplifier circuit that performs amplification processing of an acoustic signal obtained by the microphone, the ADC that converts an analog signal to a digital signal, and a signal processing circuit that performs processing such as noise cancellation and sound source separation. The in-vehicle microphones 220A to 220D each output the detected third signal to the ANC 250.

The ANC 250 is a unit that generates a noise cancellation signal as described with respect to FIG. 5. The ANC 250 according to the present embodiment corresponds to a fourth unit. The ANC 250 acquires the third signal and the second signal. Here, the ANC 250 acquires the third signal and the second signal via a path not including the wireless communication path. The ANC 250 then generates the noise cancellation signal on the basis of the third signal and the second signal. In the present operation mode, the third signal is used as an error signal in the noise cancellation processing by the ANC 250. However, the ANC 250 generates the noise cancellation signal (corresponding to a second noise cancellation signal) which is directed to a frequency component lower than a second frequency, out of noises generated from the noise source.

An output signal is generated on the basis of the noise cancellation signal generated by the ANC 250. In the example illustrated in FIG. 9, in the vehicle-mounted unit 200, the DAC 240 converts the noise cancellation signal from a digital signal to an analog signal, and the amplifier 242 amplifies the converted analog signal to generate an output signal. The output signal thus generated is outputted by each of the in-vehicle speakers 210A to 210D.

The processing in the ear hole opening device 100 is as described above with reference to FIG. 7. That is, the ANC 300A and the ANC 300B each acquire the first signal via the path (corresponding to the first path) not including the wireless communication path. In addition, the ANC 300 acquires the second signal via the path (corresponding to the second path) including the wireless communication path from the wireless transmitter 230 to the wireless receiver 150. Then, the ANC 300A and the ANC 300B each generate a noise cancellation signal on the basis of the first signal and the second signal and the acoustic signal generated from the sound source 164. Then, an output signal based on the noise cancellation signal is outputted from the acoustic generator 110. However, in the present operation mode, the ANC 300A and the ANC 300B each generate a noise cancellation signal (corresponding to a first noise cancellation signal) which is directed to a frequency component higher than a first frequency, out of the noises generated from the noise source. Output signals are generated on the basis of the respective noise cancellation signal generated by the ANC 300A and the ANC 300B, and are outputted by the acoustic generators 110A and 110B.

According to the present operation mode, an output signal based on the noise cancellation signal directed to a frequency component higher than the first frequency is outputted on side of the ear hole opening device 100, and an output signal based on the noise cancellation signal directed to a frequency component lower than the second frequency is outputted on side of the vehicle-mounted unit 200. That is, the high-frequency component of the noise is cancelled on the side of the ear hole opening device 100, and the low-frequency component of the noise is cancelled on the side of the vehicle-mounted unit 200. Such a coordinated operation makes it possible to efficiently obtain a noise cancellation effect.

It is difficult for the ear hole opening device 100 to cancel the low-frequency noise due to restriction such as size of an acoustic circuit. Meanwhile, it is difficult for the vehicle-mounted unit 200 to cancel the high-frequency noise due to distance restriction between the error microphone and the speaker. In this respect, according to the present operation mode, a coordinated operation is achieved in which the side of the ear hole opening device 100 cancels a noise in a high frequency band that is difficult for the side of the vehicle-mounted unit 200 to cancel, and the side of the vehicle-mounted unit 200 cancels a noise in a low frequency band that is difficult for the side of the ear hole opening device 100 to cancel. Such a coordinated operation that compensates each other enables the noise canceling system 1 to obtain a high noise cancellation effect for a wide frequency band.

The noise cancellation effect for the high-frequency noise using the noise cancellation signal greatly varies in accordance with a positional relationship between the ear and the speaker. In a state where the ear hole opening device 100 is worn, the position of the ear of the user and the position of the speaker (the acoustic generator 110 or the other end 122) are fixed. Accordingly, outputting an output signal for cancellation of a high-frequency noise from the speaker of the ear hole opening device 100 is effective to stably exhibit the noise cancellation effect.

It is to be noted that the first frequency and the second frequency may be the same or different. In order to obtain the noise cancellation effect in the entire frequency band, it is desirable that both frequencies be the same or that the second frequency be higher than the first frequency (i.e., frequency bands to be cancelled partially overlap).

(4) Fourth Operation Mode

The present operation mode is a mode in which only the signal of the acoustic input section 140 is utilized as an error signal, and in which an output signal based on a noise cancellation signal is outputted by the acoustic generator 110 and the in-vehicle speaker 210. In particular, in the present operation mode, the ear hole opening device 100 and the vehicle-mounted unit 200 share frequency bands and perform noise cancellation processing.

FIG. 10 is an explanatory diagram of a fourth operation mode of the noise canceling system 1 according to the present embodiment. In the operation mode illustrated in FIG. 10, the ANC 300A and the ANC 300B provided in the ear hole opening device 100 and an ANC 300C provided in the vehicle-mounted unit 200 operate. In FIG. 10, as for the components of the ear hole opening device 100, the same components are denoted with the same reference numerals followed by different alphabets to distinguish between the components for the right ear and for the left ear. The component with the alphabet A performs processing for the right ear, and the component with the alphabet B performs processing for the left ear. It is assumed that the user who wears the ear hole opening device 100 is in the vehicle interior of the automobile mounted with the vehicle-mounted unit 200.

The wireless transmitter 230 of the vehicle-mounted unit 200 acquires the second signal from the engine 290, and transmits the acquired second signal to the ear hole opening device 100 via the wireless communication path (i.e., wireless transmission). Other processing in the vehicle-mounted unit 200 is as described above with reference to FIG. 8. That is, the ANC 300C acquires the first signal via the path (corresponding to the third path) including the wireless communication path from the wireless transmitter 152 to the wireless receiver 232. In addition, the ANC 300C acquires the second signal via the path (corresponding to the fourth path) not including the wireless communication path. The ANC 300C then generates a noise cancellation signal on the basis of the first signal and the second signal. However, the ANC 300C generates a noise cancellation signal (corresponding to a third noise cancellation signal) which is directed to a frequency component lower than the second frequency, out of the noises generated from the noise source. On the basis of the noise cancellation signal generated by the ANC 300C, an output signal is generated and outputted by each of the in-vehicle speakers 210A to 210D.

The processing in the ear hole opening device 100 is as described above with reference to FIG. 7. That is, the ANC 300A and the ANC 300B each acquire the first signal via the path (corresponding to the first path) not including the wireless communication path. In addition, the ANC 300A and the ANC 300B each acquire the second signal via the path (corresponding to the second path) including the wireless communication path from the wireless transmitter 230 to the wireless receiver 150. Then, the ANC 300A and the ANC 300B each generate a noise cancellation signal on the basis of the first signal and the second signal, and the acoustic signal generated from the sound source 164. Then, an output signal based on the noise cancellation signal is outputted from the acoustic generator 110. However, in the present operation mode, the ANC 300A and the ANC 300B each generate a noise cancellation signal (corresponding to the first noise cancellation signal) which is directed to a frequency component higher than the first frequency, out of the noises generated from the noise source.

According to the present operation mode, the same effect as that of the third operation mode is achieved. That is, in the present operation mode, it is possible to efficiently obtain a noise cancellation effect and to obtain a high noise cancellation effect directed to a wide frequency band.

Further, according to the present operation mode, only the acoustic input section 140 of the ear hole opening device 100 serves as an error microphone. Therefore, when the in-vehicle speaker 210 is mounted on an automobile, it is possible to construct the noise canceling system 1 by retrofitting.

3. FLOW OF PROCESSING

Hereinafter, description is given of an example of a flow of processing in the noise canceling system 1 with reference to FIGS. 11 to 13.

FIG. 11 is a flow chart illustrating an example of a flow of operation mode control processing to be executed by the ANC 300 according to the present embodiment. It is assumed that one or both of the ear hole opening device 100 and the vehicle-mounted unit 200 include the ANC 300. Processing described below may be performed by either the ANC 300 included in the ear hole opening device 100 or the ANC 300 included in the vehicle-mounted unit 200.

As illustrated in FIG. 11, first, the ANC 300 determines whether or not the noise cancellation effect is sufficiently obtained by the ear hole opening device 100 alone (step S100). For example, the ANC 300 included in the ear hole opening device 100 first determines whether or not the noise is sufficiently canceled on the basis of the error signal while operating in the first operation mode.

In a case where determination is made that the noise cancellation effects is sufficiently obtained by the ear hole opening device 100 alone (step S100/YES), the ANC 300 selects the first operation mode (step S102).

Meanwhile, in a case where determination is made that the noise cancellation effect is not sufficiently obtained by the ear hole opening device 100 alone (step S100/NO), the ANC 300 determines whether or not a plurality of users wearing the ear hole opening device 100 rides in the vehicle interior of the automobile (step S104).

In a case where determination is made that the plurality of users rides (step S104/YES), the ANC 300 determines whether or not there are more high-frequency noises than a predetermined threshold value (step S106). In a case where determination is made that there are more high-frequency noises than the predetermined threshold value (step S106/YES), the ANC 300 selects the third operation mode (step S108). Meanwhile, in a case where determination is made that there are less high-frequency noises than the predetermined threshold value (step S106/NO), the ANC 300 selects the second operation mode (step S110).

In a case where determination is made that one user rides (step S104/NO), the ANC 300 determines whether or not there are more high-frequency noises than a predetermined threshold value (step S112). In a case where determination is made that there are more high-frequency noises than the predetermined threshold value (step S112/YES), the ANC 300 selects the fourth operation mode (step S114). Meanwhile, in a case where determination is made that there are less high-frequency noises than the predetermined threshold value (step S112/NO), the ANC 300 selects the second operation mode (step S116).

Thus, the processing ends.

FIGS. 12 and 13 are each a sequence diagram that describes an example of a flow of coordinated operation processing between the ear hole opening device 100 and the vehicle-mounted unit 200. It is assumed that the ANC 300 is included in one or both of the ear hole opening device 100 and the vehicle-mounted unit 200.

As illustrated in FIG. 12, first, the ear hole opening device 100 and the vehicle-mounted unit 200 perform coupling processing. To be more specific, first, the vehicle-mounted unit 200 transmits a wireless signal including identification information (step S300). The identification information includes, for example, information for identifying the vehicle-mounted unit 200, such as a manufacturer ID and a product ID of the vehicle-mounted unit 200. The ear hole opening device 100 receives the wireless signal (step S200), and determines whether or not the received wireless signal is a signal from the vehicle-mounted unit 200 (step S202). In a case where the signal is not from the vehicle-mounted unit 200 (step S202/NO), the ear hole opening device 100 continues to receive the wireless signal. Meanwhile, in a case where the signal is from the vehicle-mounted unit 200 (step S202/YES), i.e., in a case where the wireless signal including the identification information is received from the vehicle-mounted unit 200, the ear hole opening device 100 transmits the wireless signal including the identification information (step S204). The identification information includes, for example, information for identifying the ear hole opening device 100, such as a manufacturer ID and a product ID of the ear hole opening device 100.

Next, the ear hole opening device 100 and the vehicle-mounted unit 200 perform coordinated adjustment processing. To be more specific, the vehicle-mounted unit 200 transmits a wireless signal including spec information to the ear hole opening device 100 (step S310), and the ear hole opening device 100 receives the wireless signal (step S210). The spec information includes, for example, an operable frequency, etc. of the vehicle-mounted unit 200. Next, the ear hole opening device 100 searches auxiliary information of the spec information of the vehicle-mounted unit 200 on the basis of the identification information of the vehicle-mounted unit 200 (step S212). Next, the ear hole opening device 100 determines a target frequency (e.g., the first frequency and the second frequency described above) and an operation mode of the noise cancellation processing of the ear hole opening device 100 and the vehicle-mounted unit 200 (step S214). As for the steps S212 and S214, the ear hole opening device 100 may access the cloud as needed. In this situation, in order to access the cloud, a wireless device provided in the vehicle-mounted unit may be routed. Then, the ear hole opening device 100 transmits a wireless signal including operation setting information to the vehicle-mounted unit 200 (step S216), and the vehicle-mounted unit 200 receives the wireless signal (step S312). The operation setting information includes, for example, information specifying a target frequency and an operation mode of the noise cancellation processing.

Next, the ear hole opening device 100 and the vehicle-mounted unit 200 perform coordinated operations. Particularly, the ear hole opening device 100 and the vehicle-mounted unit 200 each perform noise cancellation processing (steps S220 and S320), and transmit wireless signals including noise cancellation processing-related information to each other. Particularly, the ear hole opening device 100 transmits a wireless signal including the noise cancellation processing-related information to the vehicle-mounted unit 200 (step S222) and receives the wireless signal (step S224) to determine whether or not the received wireless signal is a signal from the vehicle-mounted unit 200 (step S226). In addition, the vehicle-mounted unit 200 transmits a wireless signal including the noise cancellation processing-related information to the ear hole opening device 100 (step S322) and receives the wireless signal (step S324) to determine whether or not the received wireless signal is a signal from the ear hole opening device 100 (step S326). It is to be noted that the noise cancellation processing-related information includes, for example, an amount of cancellation of a noise of each of the ear hole opening device 100 and the vehicle-mounted unit 200, trouble information, and the like. Each of the ear hole opening device 100 and the vehicle-mounted unit 200 may change the operation setting information on the basis of the noise-cancellation-processing-related information of the other and notify the other of the operation setting information. The ear hole opening device 100 and the vehicle-mounted unit 200 continue the noise cancellation processing (steps S220 and S320) during receiving mutual wireless signals (steps S226/YES and S326/YES). Meanwhile, the ear hole opening device 100 and the vehicle-mounted unit 200 end the coordinated operation in a case where the mutual wireless signals are not received any more due to, for example, the distance exceeding a communicable distance (steps S226/NO and S326/NO).

Thus, the processing ends.

4. CONFIGURATION EXAMPLE OF HARDWARE

Finally, description is given of a hardware configuration of an information processor according to the present embodiment with reference to FIG. 14. FIG. 14 is a block diagram illustrating an example of the hardware configuration of the information processor according to the present embodiment. It is to be noted that an information processor 900 illustrated in FIG. 14 may achieve, for example, the ear hole opening device 100, the vehicle-mounted unit 200, or the ANC 300 illustrated in FIG. 3. Information processing performed by the ear hole opening device 100, the vehicle-mounted unit 200, or the ANC 300 according to the present embodiment is achieved by cooperation of software and hardware that is described below.

As illustrated in FIG. 14, the information processor 900 includes a CPU (Central Processing Unit) 901, a ROM (Read Only Memory) 902, a RAM (Random Access Memory) 903, and a host bus 904a. In addition, the information processor 900 includes a bridge 904, an external bus 904b, an interface 905, an input device 906, an output device 907, a storage device 908, a drive 909, a coupling port 911, and a communication device 913. The information processor 900 may include a processing circuit such as an electric circuit, a DSP, or an ASIC in place of or in addition to the CPU 901.

The CPU 901 serves as an arithmetic processing unit and a control unit, and controls overall operations in the information processing unit 900 in accordance with various programs. In addition, the CPU 901 may also be a microprocessor. The ROM 902 stores a program to be used by the CPU 901, an operation parameter, and the like. The RAM 903 temporarily stores a program to be used in execution by the CPU 901, a parameter that appropriately varies in the execution, and the like. The CPU 901 may form the acquisition section 310, the signal processing section 320, and the operation mode control section 330 of the ANC 300.

The CPU 901, the ROM 902, and the RAM 903 are coupled to one another by a host bus 904a including a CPU bus, etc. The host bus 904a is coupled to the external bus 904b such as a PCI (Peripheral Component Interconnect/

Interface) bus via the bridge 904. It is to be noted that the host bus 904a, the bridge 904, and the external bus 904b do not necessarily need to be configured separately, and these functions may be implemented in one bus.

The input device 906 is achieved by, for example, a device into which information is inputted by a user, such as a mouse, a keyboard, a touch panel, buttons, a microphone, a switch, and a lever. In addition, the input device 906 may be, for example, a remote control device utilizing infrared rays or other radio waves, or may be an externally coupled apparatus such as a mobile phone or a PDA responsive to the operation of the information processor 900. Further, the input device 906 may include, for example, an input control circuit that generates an input signal on the basis of information inputted by the user using the above-mentioned input means and outputs the generated input signal to the CPU 901. The user of the information processor 900 is able to input various data to the information processor 900 or instruct a processing operation by operating the input device 906. The input device 906 is included, for example, in one or both of the ear hole opening device 100 and the vehicle-mounted unit 200 illustrated in FIG. 3.

The output device 907 is formed by a device that is able to visually or auditorily notify the user of acquired information. Examples of such a device include a display device such as a CRT display device, a liquid crystal display device, a plasma display device, an EL display device, a laser projector, an LED projector and a lamp, an audio output device such as a speaker and a headphone, and a printer device. The output device 907 outputs, for example, results obtained by various types of processing performed by the information processor 900. Specifically, the display device visually displays the results obtained by various types of processing performed by the information processor 900 in various formats such as a text, an image, a table, a graph, and the like. Meanwhile, the audio output device converts an audio signal including reproduced audio data, acoustic data, or the like to an analog signal, and outputs the converted analog signal auditorily. The output device 907 is included, for example, in one or more of the ear hole opening device 100 and the vehicle-mounted unit 200 illustrated in FIG. 3.

The storage device 908 is a device for data storage formed as an example of a storage section of the information processor 900. The storage device 908 is achieved by, for example, a magnetic storage section device such as an HDD, a semiconductor storage device, an optical storage device, a magneto-optical storage device, or the like. The storage device 908 may include a storage medium, a recording device that records data in the storage medium, a reading device that reads data from the storage medium, a deleting device that deletes data recorded in the storage medium, and the like. The storage device 908 stores a program to be executed by the CPU 901, various data, various data acquired from the outside, and the like.

The drive 909 is a reader/writer for a storage medium, and is built in or externally attached to the information processor 900. The drive 909 reads information recorded in a removable storage medium mounted thereon such as a magnetic disk, an optical disk, a magneto-optical disk, or a semiconductor memory, and outputs the read information to the RAM 903. In addition, the drive 909 is able to also write information into the removable storage medium.

The coupling port 911 is an interface to be coupled to an external apparatus, and is a connection port to which data is transmittable by, for example, USB (Universal Serial Bus), or the like.

The communication device 913 is, for example, a communication interface formed by a communication device or the like for being coupled to a network 920. The communication device 913 is, for example, a communication card, etc. for wired or wireless LAN (Local Area Network), LTE (Long Term Evolution), Bluetooth (registered trademark), or WUSB (Wireless USB). In addition, the communication device 913 may be a router for optical communication, a router for ADSL (Asymmetric Digital Subscriber Line), a modem for various types of communication, or the like. The communication device 913 is able to transmit and receive a signal and the like to and from the Internet or other communication apparatuses in compliance with a predetermined protocol such as TCP/IP, for example. In the present embodiment, the ear hole opening device 100, the vehicle-mounted unit 200, and the ANC 300 illustrated in FIG. 3 each include the communication device 913, and communicate with one another by wire or wirelessly.

It is to be noted that the network 920 is a wired or wireless transmission path for information transmitted from apparatuses coupled to the network 920. For example, the network 920 may include a public network such as the Internet, a telephone network, and a satellite communication network, and various types of LAN (Local Area Network), WAN (Wide Area Network), and the like including Ethernet (registered trademark). In addition, the network 920 may also include a private line network, such as IP-VPN (Internet Protocol-Virtual Private Network).

An example of a hardware configuration that makes it possible to achieve functions of the information processor 900 according to the present embodiment has been given above. Each of the above-mentioned components may be achieved using a general-purpose member, or may be achieved by hardware specialized for the function of each component. Accordingly, it is possible to appropriately change a hardware configuration to be used in accordance with a technique level at the time of implementing the present embodiment.

It is to be noted that it is possible to produce a computer program for achieving the functions of the information processor 900 according to the present embodiment as described above and to install the computer program on a PC or the like. In addition, it is also possible to provide a computer-readable recording medium that stores such a computer program. The recording medium is, for example, a magnetic disk, an optical disk, a magneto-optical disk, a flash memory, or the like. In addition, the computer program may be distributed via a network, for example, without using a recording medium.

5. CONCLUSION

The description has been given above of an embodiment of the present disclosure with reference to FIGS. 1 to 14. As described above, the ANC 300 according to the present embodiment acquires the first signal to be detected by the ear hole opening device 100 having the acoustic input section 140 disposed within a predetermined distance from one ear hole of the user while being worn by the user. In addition, the ANC 300 acquires the second signal, that indicates a noise generated from the noise source, to be acquired by the vehicle-mounted unit 200. Then, the ANC 300 generates a noise cancellation signal directed to the noise on the basis of the acquired first signal and second signal. In this manner, it is possible for the ANC 300 to efficiently cancel the noise generated from the noise source by operating in coordination with the ear hole opening device 100 and the vehicle-mounted unit 200.

Although the description has been given in detail hereinabove of the preferred embodiments of the present disclosure with reference to the accompanying drawings, the technical scope of the present disclosure is not limited to such examples. It is obvious that a person having ordinary skill in the art of the present disclosure may find various alterations or modifications within the scope of the technical idea described in the claims, and it should be understood that these alterations and modifications naturally come under the technical scope of the present disclosure.

For example, in the above embodiment, the description has been given, as an example, of the case where the first unit is the ear hole opening device 100, but the present technology is not limited to such an example. For example, the first unit may be any type of a wearable device, such as a neckband type, an earring type, or a spectacle type.

In the above embodiment, the description has been given, as an example, of the case where the second unit is the vehicle-mounted unit 200, but the present technology is not limited to such an example. The second unit may be any unit that manages a noise source, and may be, for example, a fan itself, a home server that manages the fan, a ventilation fan, a motorcycle, a helicopter, a train, or the like.

In the above embodiment, the description has been given, as an example, of the case where an acoustic is outputted to a space, but the present technology is not limited to such an example. For example, the acoustic may be outputted non-spatially by a bone conduction speaker, etc.

Each of the units described herein may be achieved as a single unit, or some or all thereof may be achieved as separate units. For example, the ANC 300 may be included in the ear hole opening device 100 or the vehicle-mounted unit 200. In addition, the ANC 300 may be provided in a unit such as a server coupled to the ear hole opening device 100 and the vehicle-mounted unit 200 via a network, etc.

The processing described with reference to the flowchart and the sequence diagrams in the present specification does not necessarily need to be executed in the illustrated order. Several processing steps may be executed in parallel. Further, additional processing steps may also be employed, and some processing steps may be omitted.

Further, the effects described herein are merely illustrative or exemplary, and are not limitative. That is, the technique according to the present disclosure may achieve, in addition to or in place of the above effects, other effects that are obvious to those skilled in the art from the description of the present specification.

It is to be noted that the technical scope of the present disclosure also includes the following configurations.

(1)
An information processor including a signal processing section, the signal processing section
acquiring a first signal to be detected by an acoustic input section of a first unit including the acoustic input section disposed within a predetermined distance from one ear hole of a user in a state of being worn by the user,
acquiring a second signal to be acquired by a second unit, the second signal indicating a noise generated from a noise source, and
generating a noise cancellation signal directed to the noise on a basis of the first signal and the second signal.

(2)
The information processor according to (1), in which the second signal includes information for determining a frequency of the noise.

(3)
The information processor according to (2), in which
the noise includes a noise associated with rotational movement, and
the second signal includes information indicating number of rotations of the rotational movement.

(4)
The information processor according to (3), in which
the noise source includes a power source of a vehicle, and
the second unit is mounted on the vehicle, and wirelessly transmits the second signal.

(5)
The information processor according to any one of (1) to (4), in which the information processor further includes an operation mode control section that selects an operation mode of the signal processing section out of a plurality of operation modes having different coordinated operations from another unit.

(6)
The information processor according to (5), in which the operation mode control section selects the operation mode in accordance with quantity of high-frequency components of the noise.

(7)
The information processor according to (6), in which
the noise source includes a power source of a vehicle, and
the operation mode control section selects the operation mode in accordance with whether or not the user has entered a vehicle interior of the vehicle.

(8)
The information processor according to (7), in which the operation mode control section selects the operation mode in accordance with number of people in the vehicle interior of the vehicle.

(9)
The information processor according to any one of (5) to (8), in which, in a case where the other unit has a noise cancellation function, the signal processing section exchanges information on noise cancellation capability with the other unit.

(10)
The information processor according to any one of (1) to (9), in which an output signal generated on a basis of the noise cancellation signal is outputted by one or both of a first acoustic output section of the first unit and a second acoustic output section of the second unit.

(11)
The information processor according to (10), in which the output signal includes one or both of the noise cancellation signal and a signal in which the noise cancellation signal and a signal resulting from application of predetermined signal processing to an acoustic signal generated from a sound source are synthesized.

(12)
The information processor according to (10) or (11), in which
the signal processing section acquires the first signal via a first path not including a wireless communication path, and acquires the second signal via a second path including the wireless communication path, and
the output signal is outputted by the first acoustic output section.

(13)

The information processor according to (12), in which the signal processing section generates the noise cancellation signal which is directed to a frequency component of the noise higher than a first frequency.

(14)

The information processor according to (10) or (11), in which the signal processing section acquires the first signal via a third path including a wireless communication path, and acquires the second signal via a fourth path not including the wireless communication path, and the output signal is outputted by the second acoustic output section.

(15)

The information processor according to (14), in which the signal processing section generates the noise cancellation signal which is directed to a frequency component of the noise lower than a second frequency.

(16)

An information processing system including:

a first unit including an acoustic input section disposed within a predetermined distance from one ear hole of a user in a state of being worn by the user, the first unit detecting a first signal by the acoustic input section;

a second unit that acquires a second signal indicating a noise generated from a noise source; and a third unit that generates a noise cancellation signal directed to the noise on a basis of the first signal and the second signal.

(17)

The information processing system according to (16), in which the information processing system further includes a fourth unit that generates a second noise cancellation signal directed to a frequency component of the noise lower than a second frequency on a basis of the second signal, the third unit generates a first noise cancellation signal directed to a frequency component of the noise higher than a first frequency, the first unit includes a first acoustic output section that outputs an output signal generated on a basis of the first noise cancellation signal, and the second unit includes a second acoustic output section that outputs an output signal generated on a basis of the second noise cancellation signal.

(18)

The information processing system according to (16), in which the information processing system includes a plurality of the third units, one of the third units generates a first noise cancellation signal directed to a frequency component of the noise higher than a first frequency, another of the third units generates a third noise cancellation signal directed to a frequency component of the noise lower than a second frequency, the first unit includes a first acoustic output section that outputs an output signal generated on a basis of the first noise cancellation signal, and the second unit includes a second acoustic output section that outputs an output signal generated on a basis of the third noise cancellation signal.

(19)

An information processing method including:

acquiring a first signal to be detected by an acoustic input section of a first unit including the acoustic input section disposed within a predetermined distance from one ear hole of a user in a state of being worn by the user;

acquiring a second signal to be acquired by a second unit, the second signal indicating a noise generated from a noise source; and generating a noise cancellation signal directed to the noise on a basis of the first signal and the second signal by a processor.

(20)

A program that causes a computer to serve as a signal processing section, the signal processing section acquiring a first signal to be detected by an acoustic input section of a first unit including the acoustic input section disposed within a predetermined distance from one ear hole of a user in a state of being worn by the user, acquiring a second signal to be acquired by a second unit, the second signal indicating a noise generated from a noise source, and generating a noise cancellation signal directed to the noise on a basis of the first signal and the second signal.

REFERENCE NUMERALS LIST 1 noise canceling system
100 ear hole opening device
110 acoustic generator
120 sound conducting section
121 one end
122 another end
123 pinch section
130 holding section
131 opening
132 support member
140 acoustic input section
150 wireless receiver
152 wireless transmitter
162 amplifier
164 sound source
166 adder
200 vehicle-mounted unit
210 in-vehicle speaker
220 in-vehicle microphone
230 wireless transmitter
232 wireless receiver
242 amplifier
290 engine
300 ANC (Active Noise Canceller)
310 acquisition section
320 signal processing section
330 operation mode control section

The invention claimed is:

1. A wearable device, comprising:
a microphone configured to detect a first signal, wherein
the wearable device is wearable on an ear in a wearable state of the wearable device, and
the microphone is at a distance from an ear hole of the ear based on the wearable state of the wearable device;
an acquisition section configured to:
acquire the first signal from the microphone; and
acquire a second signal from a vehicle mounted unit, wherein the second signal indicates a noise from a noise source;
a digital signal processor (DSP) configured to receive first noise cancellation capability information of the vehicle mounted unit from the vehicle mounted unit based on a noise cancellation function of the vehicle mounted unit; and an operation mode control section configured to select a first operation mode of a plurality of operation modes of the DSP based on the received first noise cancellation capability information, wherein each operation mode of the plurality of operation modes corresponds to a coordinated operation of the DSP with the vehicle mounted unit, the coordinated operation of the DSP with the vehicle mounted unit in the first operation mode is different from the coordinated operation of the DSP with the vehicle mounted unit in a second operation mode of the plurality of operation modes, the coordinated operation of the DSP with the vehicle mounted unit in the first operation mode is based on a frequency band shared between the microphone and the vehicle mounted unit, and the DSP is further configured to:
transmit second noise cancellation capability information of the wearable device to the vehicle mounted unit based on the noise cancellation function of the vehicle mounted unit, wherein the transmitted second noise cancellation capability information indicates the first operation mode; and
generate a noise cancellation signal, for the noise, based on the acquired first signal, the acquired second signal, and the first operation mode.

2. The wearable device according to claim 1, further comprising circuitry configured to determine a frequency of the noise based on the acquired second signal.

3. The wearable device according to claim 2, wherein the noise is associated with a rotational movement of a moving body of the noise source, and
the second signal comprises information indicating a number of rotations of the rotational movement of the moving body.

4. The wearable device according to claim 3, wherein the noise source comprises a power source of a vehicle, the vehicle mounted unit is on the vehicle,
the vehicle mounted unit wirelessly transmits the second signal, and
the acquisition section is further configured to wirelessly acquire the second signal transmitted by the vehicle mounted unit.

5. The wearable device according to claim 1, wherein the operation mode control section is further configured to select the first operation mode based on a quantity of high-frequency components of the noise.

6. The wearable device according to claim 5, wherein the wearable device is wearable on the ear of a user,
the noise source comprises a power source of a vehicle, and
the operation mode control section is further configured to select the first operation mode based on an entry of the user in the vehicle.

7. The wearable device according to claim 6, wherein the operation mode control section is further configured to select the first operation mode based on a number of people in the vehicle.

8. The wearable device according to claim 1, further comprising:
circuitry configured to generate an output signal based on the noise cancellation signal; and
a first acoustic output section configured to output the output signal.

9. The wearable device according to claim 8, wherein the circuitry is further configured to generate a synthesized signal by synthesis of the noise cancellation signal and a specific signal,
the specific signal is generated by application of a signal process on an acoustic signal of a sound source, and
the output signal comprises at least one of the noise cancellation signal or the synthesized signal.

10. The wearable device according to claim 8, wherein the acquisition section is further configured to:
acquire the first signal via a first path including a wired communication path; and
acquire the second signal via a second path including a wireless communication path.

11. The wearable device according to claim 10, wherein the digital signal processor is further configured to generate the noise cancellation signal for a frequency component of the noise, and
the frequency component of the noise is higher than a first frequency of the noise.

12. The wearable device according to claim 8, wherein the acquisition section is further configured to:
acquire the first signal via a third path including a wireless communication path; and
acquire the second signal via a fourth path including a wired communication path, and
the output signal is output by a second acoustic output section of the vehicle mounted unit.

13. The wearable device according to claim 12, wherein the digital signal processor is further configured to generate the noise cancellation signal for a frequency component of the noise, and
the frequency component of the noise is lower than a second frequency of the noise.

14. An information processing system, comprising:
a wearable device that includes a microphone, wherein
the wearable device is wearable on an ear in a wearable state of the wearable device,
the microphone is at a distance from an ear hole of the ear based on the wearable state of the wearable device, and
the wearable device is configured to:
detect a first signal by the microphone; and
output the first signal;
a vehicle mounted unit configured to acquire a second signal indicating a noise from a noise source; and
a first unit that comprises:
an acquisition section configured to:
acquire the first signal from the wearable device;
acquire the second signal from the vehicle mounted unit;
a digital signal processor (DSP) configured to receive first noise cancellation capability information of the vehicle mounted unit from the vehicle mounted unit based on a noise cancellation function of the vehicle mounted unit; and
an operation mode control section configured to select a first operation mode of a plurality of operation modes of the DSP based on the received first noise cancellation capability information, wherein
each operation mode of the plurality of operation modes corresponds to a coordinated operation of the DSP with the vehicle mounted unit,
the coordinated operation of the DSP with the vehicle mounted unit in the first operation mode is different from the coordinated operation of the DSP with the vehicle mounted unit in a second operation mode of the plurality of operation modes,
the coordinated operation of the DSP with the vehicle mounted unit in the first operation mode is based on a frequency band shared between the microphone and the vehicle mounted unit, and
the DSP is further configured to:
transmit second noise cancellation capability information of the wearable device to the vehicle mounted unit based on the noise cancellation function of the vehicle mounted unit, wherein the transmitted second noise cancellation capability information indicates the first operation mode; and
generate a noise cancellation signal, for the noise, based on the acquired first signal, the acquired second signal, and the first operation mode.

15. The information processing system according to claim 14, wherein
the information processing system further comprises a second unit configured to generate a second noise cancellation signal, based on the second signal, for a first frequency component of the noise,
the first frequency component of the noise is lower than a second frequency of the noise,
the first unit is further configured to generate a first noise cancellation signal for a second frequency component of the noise,
the second frequency component is higher than a first frequency of the noise,
the wearable device further includes a first acoustic output section configured to output a first output signal,
the first output signal is based on the first noise cancellation signal,
the vehicle mounted unit includes a second acoustic output section configured to output a second output signal, and
the second output signal is based on the second noise cancellation signal.

16. The information processing system according to claim 14, wherein
the information processing system further comprises a plurality of active noise canceller (ANC) units,
a first ANC unit of the plurality of ANC units is configured to generate a first noise cancellation signal for a first frequency component of the noise,
the first frequency component is higher than a first frequency of the noise,
a second ANC unit of the plurality of ANC units is configured to generate a third noise cancellation signal for a second frequency component of the noise,
the second frequency component is lower than a second frequency of the noise,
the wearable device further includes a first acoustic output section configured to output a first output signal,
the first output signal is based on the first noise cancellation signal,
the vehicle mounted unit includes a second acoustic output section configured to output a second output signal, and
the second output signal is based on the third noise cancellation signal.

17. An information processing method, comprising:
detecting, by a microphone of a wearable device, a first signal;
acquiring, by an acquisition unit, the first signal from the microphone, wherein
the wearable device is wearable on an ear in a wearable state of the wearable device, and
the microphone is at a distance from an ear hole of the ear based on the wearable state of the wearable device;
acquiring, by the acquisition unit, a second signal from a vehicle mounted unit, wherein the second signal indicates a noise from a noise source;
receiving, by a digital signal processor (DSP), first noise cancellation capability information of the vehicle mounted unit from the vehicle mounted unit based on a noise cancellation function of the vehicle mounted unit;
selecting, by an operation mode control section, a first operation mode of a plurality of operation modes of the DSP based on the received first noise cancellation capability information, wherein
each operation mode of the plurality of operation modes corresponds to a coordinated operation of the DSP with the vehicle mounted unit, and
the coordinated operation of the DSP with the vehicle mounted unit in the first operation mode is different from the coordinated operation of the DSP with the vehicle mounted unit in a second operation mode of the plurality of operation modes, and
the coordinated operation of the DSP with the vehicle mounted unit in the first operation mode is based on a frequency band shared between the microphone and the vehicle mounted unit;
transmitting, by the DSP, second noise cancellation capability information of the wearable device to the vehicle mounted unit based on the noise cancellation function of the vehicle mounted unit, wherein the transmitted second noise cancellation capability information indicates the first operation mode; and
generating, by the DSP, a noise cancellation signal, for the noise, based on the acquired first signal, the acquired second signal, and the first operation mode.

18. A non-transitory computer-readable medium having stored thereon computer-executable instructions which, when executed by a processor, cause the processor to execute operations, the operations comprising:
detecting, by a microphone of a wearable device, a first signal;
acquiring, by an acquisition unit, the first signal from the microphone, wherein
the wearable device is wearable on an ear in a wearable state of the wearable device, and
the microphone is at a distance from an ear hole of the ear based on the wearable state of the wearable device;
acquiring, by the acquisition unit, a second signal from a vehicle mounted unit, wherein the second signal indicates a noise from a noise source;
receiving, by a digital signal processor (DSP), first noise cancellation capability information of the vehicle mounted unit from the vehicle mounted unit based on a noise cancellation function of the vehicle mounted unit;
selecting, by an operation mode control section, a first operation mode of a plurality of operation modes of the DSP based on the received first noise cancellation capability information, wherein
each operation mode of the plurality of operation modes corresponds to a coordinated operation of the DSP with the vehicle mounted unit, and the coordinated operation of the DSP with the vehicle mounted unit in the first operation mode is different from the coordinated operation of the DSP with the vehicle mounted unit in a second operation mode of the plurality of operation modes, and the coordinated operation of the DSP with the vehicle mounted unit in the first operation mode is based on a frequency band shared between the microphone and the vehicle mounted unit;

transmitting, by the DSP, second noise cancellation capability information of the wearable device to the vehicle mounted unit based on the noise cancellation function of the vehicle mounted unit, wherein the transmitted second noise cancellation capability information indicates the first operation mode; and generating, by the DSP, a noise cancellation signal, for the noise, based on the acquired first signal, the acquired second signal, and the first operation mode.

\* \* \* \* \*